(12) United States Patent
Harvey

(10) Patent No.: US 11,359,893 B2
(45) Date of Patent: Jun. 14, 2022

(54) METHODS AND SYSTEMS FOR PLAYING FIELD FOOTBALL DART GAME

(71) Applicant: Carlton Brown Harvey, Atlanta, GA (US)

(72) Inventor: Carlton Brown Harvey, Atlanta, GA (US)

(*) Notice: Subject to any disclaimer, the term of this patent is extended or adjusted under 35 U.S.C. 154(b) by 0 days.

(21) Appl. No.: 17/033,880

(22) Filed: Sep. 27, 2020

(65) Prior Publication Data

US 2021/0095939 A1    Apr. 1, 2021

Related U.S. Application Data

(60) Provisional application No. 62/906,746, filed on Sep. 27, 2019.

(51) Int. Cl.

| | |
|---|---|
| *F41J 3/02* | (2006.01) |
| *F41J 3/00* | (2006.01) |
| *A63F 13/214* | (2014.01) |
| *A63F 13/812* | (2014.01) |
| *A63F 13/23* | (2014.01) |

(52) U.S. Cl.
CPC .......... *F41J 3/0076* (2013.01); *A63F 13/214* (2014.09); *A63F 13/23* (2014.09); *A63F 13/812* (2014.09); *F41J 3/02* (2013.01); *A63F 2300/1025* (2013.01); *A63F 2300/1068* (2013.01); *A63F 2300/8011* (2013.01)

(58) Field of Classification Search
CPC .......... F41J 3/0076; F41J 3/02; A63F 13/214; A63F 13/23; A63F 13/812; A63F 2300/1025; A63F 2300/1068; A63F 2300/8011

USPC ........................................................... 463/4
See application file for complete search history.

(56) References Cited

U.S. PATENT DOCUMENTS

| | | | |
|---|---|---|---|
| 3,979,117 A | * | 9/1976 | Worsham ............... F41J 3/0076 273/408 |
| 5,664,782 A | | 9/1997 | Lacks et al. |
| 5,967,518 A | | 10/1999 | Rowe |
| 5,979,898 A | * | 11/1999 | Pan ........................ F41J 3/0071 273/371 |
| 6,402,154 B1 | | 6/2002 | Hess et al. |
| 7,470,186 B2 | | 12/2008 | Cannon |
| 7,806,409 B1 | * | 10/2010 | Cardenas ................ F41J 5/04 273/371 |

(Continued)

*Primary Examiner* — Allen Chan
(74) *Attorney, Agent, or Firm* — Kanika Radhakrishnan; Evergreen Valley Law Group

(57) ABSTRACT

Methods and systems for playing field football dart game. The method includes receiving request to start field football dart game from player device. The method includes presenting user interface (UI) of field football dart gaming application on player device based on received request. The UI includes a dartboard with one or more darts, yard field with yard lines, football placed on yard field, a scoreboard associated with each player, a timer and a plurality of actionable buttons. The method further includes facilitating playing of field football dart game by receiving dart inputs in response to throws of physical darts on physical dartboard by players, and moving football placed on yard field in response to dart inputs in field football dart gaming application and a plurality of pre-defined rules. The dart inputs are provided by one or more players by moving darts on dartboard in field football dart gaming application.

20 Claims, 20 Drawing Sheets

(56) References Cited

U.S. PATENT DOCUMENTS

| | | | |
|---|---|---|---|
| 8,096,558 B2* | 1/2012 | Curcija | A63F 7/0608 |
| | | | 273/408 |
| 9,329,002 B1 | 5/2016 | Krzewicki et al. | |
| 2005/0062232 A1* | 3/2005 | Pavlik | F41J 3/02 |
| | | | 273/408 |
| 2019/0154411 A1 | 5/2019 | Delgrande | |

* cited by examiner

|  | OFFENCE | DEFENSE | KICKOFF | PUNTING | RETURNING |
| --- | --- | --- | --- | --- | --- |
| SINGLES | 17 = 17 Yds | ⊘17 = 0 Yds | 17 (x4)= 68 Yds | 17 (x3)= 51 Yds | ◯17 = 10 Yds |
| DOUBLES | D17 = 37 Yds | ⊘D17 = -10 Yds | T17 (x4)= 68 Yds | D17 (x3)= 51 Yds | ◯D17 = 30 Yds |
| TREBLES | T17 = 27 Yds | ⊘T17 = -5 Yds | T17 (x4)= 68 Yds | T17 (x3)= 51 Yds | ◯T17 = 20 Yds |
| OUTER BULL | 50 Yds | After ⊘ = Turnover | Onside Kick | 63 Yds | 50 Yds |
| INNER BULL | Touchdown | After ⊘ = Turnover/ Touchdown | Onside Kick | 66 Yds | Touchdown |
| MISS | 0 Yds Turnover open | Forfeit Next Throw | 0 Yards | 0 Yds | Turnover |
| Field Goal Range Target | 1-15 Yards inner Singles Section | 16-30 Yards Outer Singles Section | 31-40 Yards Outer Singles Section | 41-45 Yards Inner Bull | |

FIG. 4

METHODS AND SYSTEMS FOR PLAYING FIELD FOOTBALL DART GAME

TECHNICAL FIELD

Embodiments of the disclosure relate generally to board games and, more particularly to, methods and systems for playing field football dart game i.e. playing American football using a dartboard.

BACKGROUND

Field football dart game (e.g., an American football dart game) is a game of football that is played using a dartboard and the participants of the field football dart game need to participate in the game at the same time and in a same space to enjoy the game. Conventionally, a few systems supporting either electronic dart game or football/field football have been developed. However, systems supporting field football dart game or gridiron darts game are currently unavailable.

Hence, there is a need for methods and systems that enable playing of field football dart game or game that supports both dartboard and American football together.

SUMMARY

Various embodiments of the present disclosure provide methods and systems for playing field football dart game.

In an embodiment, a method is disclosed. The method includes receiving a request to start a field football dart game from a player device associated with one or more players. The method includes presenting a user interface (UI) of a field football dart gaming application on the player device based on the request received from the player device. The UI includes a dartboard with one or more darts, a yard field with one or more yard lines, a football placed on the yard field, a scoreboard associated with each player of the one or more players, a timer and a plurality of actionable buttons. The method further includes facilitating playing of the field football dart game by receiving dart inputs in response to throws of one or more physical darts on a physical dartboard by the one or more players, and moving the football placed on the yard field in response to the dart inputs in the field football dart gaming application and a plurality of pre-defined rules of the field football dart game. The dart inputs are provided by the one or more players by moving the one or more darts on the dartboard in the field football dart gaming application.

In another embodiment, a server system is disclosed. The server system includes a memory to store instructions and a processor to execute the stored instructions in the memory and thereby cause the server system to receive a request to start a field football dart game from a player device associated with one or more players. The server system is further configured to present a user interface (UI) of a field football dart gaming application on the player device based on the request received from the player device. The UI includes a dartboard, a yard field with one or more yard lines, a football placed on the yard field, a scoreboard associated with each player of the one or more players, a timer and a plurality of actionable buttons. The server system is further configured to facilitate playing of the field football dart game by receiving dart inputs in response to throws of one or more physical darts on a physical dartboard by the one or more players, and moving the football placed on the yard field in response to the dart inputs in the field football dart gaming application and a plurality of pre-defined rules of the field football dart game.

In yet another embodiment, a system is disclosed. The system includes a database, a user interface (UI) module, a yardage gain/loss calculation module, a football movement management module, a scoring player determination module, a score calculation module, a timer management module and a processing module. The database is configured to store a plurality of pre-defined rules for playing a field football dart game. The UI module is in communication with the database. The UI module is configured to present one or more UIs for facilitating playing of the field football dart game. The yardage gain/loss calculation module is in communication with the UI module and the database. The yardage gain/loss calculation module is configured to calculate yardage gain/loss by a football on a yard field based on dart inputs provided by a player of the one or more players playing the field football dart game and the plurality of pre-defined rules defined for the field football dart game. The dart inputs are generated in response to throws of the one or more darts on a physical dart board by the players depending upon their turn. The football movement management module is in communication with the yardage gain/loss calculation module, the UI module and the database. The football movement management module is configured to manage movement of the football on the yard field based on the calculated yardage gain/loss. The scoring player determination module is in communication with the football movement management module and the UI module. The scoring player determination module is configured to determine a scoring player among the one or more players playing the field football dart game based on a delivery of a touchdown. The score calculation module is in communication with the scoring player determination module. The score calculation module is configured to update a scoreboard, associated with the scoring player with the plurality of points. The timer management module is in communication with the UI module. The timer management module is configured to manage a timer based on throws made by the one or more players. The processing module is configured to send operating instructions to the database, the UI module, the yardage gain/loss calculation module, the football movement management module, the winning player determination module, the score calculation module and the timer management module for facilitating playing of the field football dart game.

BRIEF DESCRIPTION OF THE FIGURES

For a more complete understanding of example embodiments of the present technology, reference is now made to the following descriptions taken in connection with the accompanying drawings in which:

FIG. 4 is an example representation of a table depicting a plurality of rules for playing an American football dart game, in accordance with an example embodiment;

Figure 1:
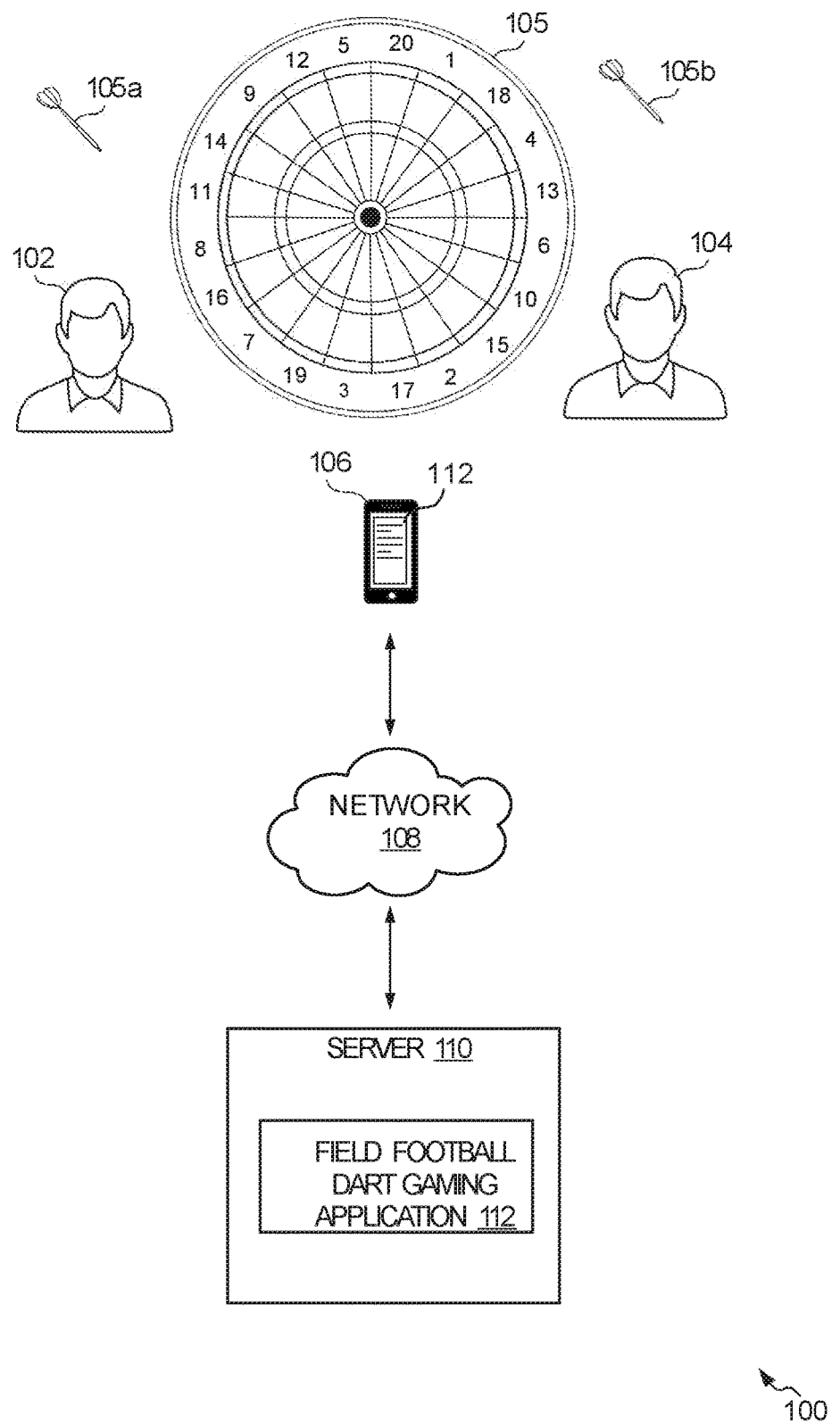
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term 'field football dart game' refers to an American football dart game or similar games, and teachings of the present disclosure can also be used for different variations of football dart game in addition to the American football dart game. Throughout the present disclosure, the terms "field football dart game" and the "American football dart game" are used interchangeably.

OVERVIEW

Various example embodiments of the present disclosure provide methods and systems for playing field football dart game such as American football dart game.

A field football dart gaming application is provided for facilitating playing of the football dart game. The field football dart gaming application provides user interfaces (UIs) that enable users (hereinafter also referred to as "players") of the field football dart gaming application to play the football dart game on a user device (hereinafter referred as player device). A UI presented by the field football dart gaming application on the player device includes a dartboard with one or more darts, a yard field with one or more yard lines, a football placed on the yard field, a scoreboard associated with each player of the one or more players, a timer and a plurality of actionable buttons.

For playing the football dart game using the field football dart gaming application, the players may throw physical darts on a physical dartboard. Based on a landing position of the physical darts on the physical dartboard, the players may provide dart inputs by moving the one or more darts on the dartboard provided on the UI facilitated by field football dart gaming application. The field football dart gaming application then calculates yardage gain/loss based on the dart inputs and a plurality of pre-defined rules of the football dart game. Further, the field football dart gaming application moves the football placed on the yard field based on the calculated yardage gain/loss.

The field football dart gaming application then determines a scoring player of a play between the players based on the dart input provided by each player. A player who is able to achieve a touchdown by gaining enough yardage on the yard field will be considered as the scoring player of the play by the field football dart gaming application. The scoring player may then be rewarded with a plurality of points by the field football dart gaming application. A player with a higher number of points at the end of the football dart game will be considered as a winner of the football dart game.

The terminologies associated with American football dart game are explained below:

First Down: A first down is the first of the four consecutive plays/throws that an offense player (player who is throwing a football) gets to advance the football on a yard field. The first down occurs when the offense player gains enough yards to retain possession of the football for an additional four downs (throws). When the offense player enters the yard field, the offense player gets four downs (throws) to achieve: either the first down or a touchdown. In an embodiment, the advancement of the football must be of at least thirty yards on the yard field to achieve the first down. If they do not achieve either, then the possession of the football is given to an opposing player i.e. defense player.

Touchdown: A touchdown occurs when one player carries the football into an end zone of the opposing player. The end zones are located on opposite ends of the yard field. When a player accomplishes a touchdown, they earn six points with an opportunity of earning one or two extra points. In football dart game, the player must accumulate enough yards through dart throws that add up to entering the end zone of an opponent player to earn six points.

Turnover: A turnover occurs when the defense player causes the offense player to lose possession of the ball so that the defense player becomes the offense player at a spot of the turnover.

Punt: A punt happens when the football is kicked to the opposing player on fourth down as an exchange of possession. If the offense player does not want to take a risk of not getting a first down/touchdown on fourth down, then they have the option of punting the football causing the defense player to receive possession further down the yard field away from the end zone of the punting player.

Touchback: A touchback happens when a player punts/kicks the football into the end zone of the opposing player. When this happens, the player receiving the football has an option of accepting a touchback. If the receiving player accepts the touchback, then they start possession of the football (as an offense player) at the twenty-yard line on their own side of the yard field.

Field Goal: In a normal football game, a field goal happens when a player on offense is not close enough to get a touchdown but is close enough to kick the football through two goalposts in order to earn 3 points. In football dart game, a field goal range begins at a 45-yard line of the opponent's side of the yard field and depending on how close a player is to his/her opponent's end zone, a part of the dartboard that the player needs to hit to earn 3 points is determined.

Muff: A muff occurs when a player is trying to return a kick/punt and they drop the football and the opposition player regains possession of the football. In football dart game, a muff occurs when the player returning a kick/punt throws their dart and it misses the dartboard entirely. When this occurs, then the opposition player regains possession of the football at the yard line of the muff.

Onside Kick: An onside kick can occur on kickoffs. If the player "kicking" the football hits a bull's eye section of the dartboard, then the football is moved up the field 10 yards (to the 40-yard line) and depending on the returning player's throw, has a chance to maintain possession of the football. If the returning player fails to hit the same bull's eye section that the kicking player hits, then the kicking player retains possession of the football. If the returning player is able to match the kicking player's throw, then the returning player gains possession of the football at a 40-yard line of the yard field. The purpose of the onside kick is a way for the kicking player to keep possession of the football after they have scored points.

The methodologies associated with the football dart game are explained below:

Playing Method: The field football dart game is a method of playing a game of American style football using a traditional English style physical dartboard. Like the American style normal football, the football dart game also includes four fifteen-minute quarters divided into two halves. The football dart game is played on a hundred-yard field. The objective of a player playing the football dart game is to accumulate enough yards to cross the opposition's goal line. The player advances the football down the yard field by throwing a set of darts while on offense. The players playing the football dart game can earn first downs, attempt field goals, punt, kickoff, convert one/two-point conversions, and play offense, defense and special teams just like in a normal American football game.

Clock Rules: In football dart game, a clock runs in an accordance with the throws made by the players playing the football dart game. One throw by a player and a response throw made by an opponent player in response to the throw is counted as one play or down and a single minute runs off the clock. The player in possession of the football throws first, and depending on the play, the opposing player throws the response throw. Once the response throw has been made, the play is over and one minute runs off the clock. Not all throws require a response throw, but a minute may still run off the clock depending on the play. Once the football dart game starts, the clock runs until the end of the half, and the same is done for the second half. The game carries over between the first and second quarters, and between the third and fourth quarters, which means that the play continues unimpeded by the change of quarters as opposed to the end of halves in which the series of plays ends after the final minute of each half. Once all sixty minutes have been played, the game is over and the player with the most points wins the football dart game. If the game is tied, then overtime is played until a winner is determined. For example, only nine minutes are left in a quarter and a player with possession of the football makes a kick off throw (throw signifying a kickoff). Once the opponent player has made their response throw (signifying the kickoff return), then one minute runs off the clock and eight minutes are left on the clock after the play is over.

Response throw scenarios: A response throw is required for all the throws except in the cases of field goals, one-point conversions, touchbacks, downing the football and when defense player forces a turnover before all corresponding response throws have been made to the offenses' throws. In the case of touchbacks, the player receiving the kick may decide if they would like to respond to the throw or they would like to take the football at a twenty-yard line. In the case of a blocked field goal, the player on defense player may make a response throw. In the case of one-point and two-point conversions, time does not run off the clock, but a response throw is made for the two-point conversion. If the player kicking the extra point completely misses the scoring area of the dartboard, then the opposition may throw a response to attempt to hit the inner bull's eye which would result in two-points for the responding player. In an example scenario, if a defense player forces a turnover on a second down, then a third downplay that an offense player has already thrown does not get counted and the clock only runs for the two defense response throws made while disregarding the third offense throw.

Game start: The football dart game starts with a 'coin toss'. Each player throws a single dart and the player whose dart lands closest to the center determines if they would like to receive the football first or defer to the second half. After the coin toss, a kickoff throw is made by the player who is selected for starting the kick off based on the toss. After the kick off throw, a response throw is made by the opponent player. The kickoff starts at the kicking player's own thirty-yard line.

Set of Downs: A set of downs begins after a change of possession or earning a first down. Generally, a change of possession is signified by the play immediately following a kickoff, a punt or a turnover. A set of downs consists of four downs (dart throws) in which the offense player attempts to gain enough yardage to earn a first down and/or touchdown. Barring time constraints at the end of a half or achieving enough yardage for a first down or touchdown, the offense makes three throws and then the defense player makes three response throws. If the offense player does not have sufficient yardage for a first down at the end of the first three downs, then the offense player has an option of making another offense throw on the fourth down i.e. punting the ball to the opposition or kicking a field goal if the player is in the field goal range. The offense player must announce their intentions before the fourth-down throw is made.

Overtime: A game enters overtime if the players are tied after the end of regulation. The overtime begins with a coin toss. The player that wins the coin toss may decide whether to play as an offense player or a defense player for the first round of overtime. A single round includes both players having a chance to play offense. For gameplay, the offense player is given position (without a kickoff) at the opposition's forty-five-yard line. The offense player then attempts to score a touchdown or a field goal with all other rules of regulation applying except that the defense player may not score off a turnover after a matched throw. The defense player may create turnovers in scenarios, such as a response to an offense player's missed throw or to match offense player's bull's eye throw but the defense player cannot score off of those turnovers. A two-point conversion is the only way to gain points after touchdowns, one-point conversions are not allowed. The player leading at the end of a round wins the game. If the score is still tied at the end of the round, then the game continues until a player is leading at the end of the round. The rotation of overtime rounds goes as follows for offense possession:

Round 1: Player A-Player B
Round 2: Player B-Player A
Round 3: Player A-Player B
Round 4: Player B-Player A Scoring: There are three ways to score and accumulate points in the football dart game: touchdowns, field goals and safeties (two additional methods for accumulating points after a touchdown with a one-point conversion game and a two-point conversion game).

Touchdown: A touchdown is registered once the player with possession of the ball accumulates enough yards to cross the goal line of the opposition after the defense has responded. A player accumulates yards by hitting the scoring segments of the dartboard including the bull's eye. The goal line is essentially the "0 yard line" on the yard field. Once the player with possession of the football meets or supersedes yardage needed to end a play on or past the goal line, it is a touchdown pending the results of the defense player response throw/s. Once a player has sufficient yardage to cross the goal line, then the opposition immediately must make response throws. If offense player crosses the goal line on the first play in a set of downs, then the defense player has one throw to respond. If offense player crosses the goal line on the second or third play of a set of downs, then the defense player has two or three throws, respectively, to respond to the downs. Whenever the goal line is crossed, an immediate response throw must be made. Touchdowns are worth six points with an extra point pending conversion. In an example scenario, if an offense player hits segments twelve, eighteen, thirteen and these throws cover sufficient yardage on the yard field to meet or supersede the goal line, then this scenario will be considered as a touchdown pending the results of the defense throws to be made by the defense player. If the offense player still has enough yardage to meet or supersede goal line after the defense responds, then the last play results in the touchdown. If the yardage cover is not sufficient for the touchdown, then this scenario will not result in the touchdown. If defense player forces a turnover before enough yardage is accumulated to cross or meet the goal line, then the touchdown is denied.

Field Goals: If a player is in a field goal range i.e. within forty-five yards of an oppositions goal line, then that player has the option of kicking a field goal that can help him in earning three points. A player must announce their intentions of kicking the field goal before making the corresponding throw. The player kicking the field goal must hit a designated area on the dartboard to make the field goal and earn three points. The area on the dartboard that the player must hit is determined by their yard position on the yard field. The yard position criteria are defined below:

1-yard line-15 yard line: If a player has the football in this area of the yard field, then the player must hit the area between an inner treble line and an outer bull's eye line on the dartboard.

16-yard line-30 yard line: If the player has the football in this area of the yard field, then the player must hit the area between the inner double line and the outer treble line on the dartboard.

31-yard line-40 yard line: If the player has the football in this area of the yard field, then the player must hit either the inner or outer bull's eye.

41-yard line-45 yard line: If the player has the football in this area of the yard field, then the player must hit the inner bull's eye.

If the dart thrown by the player fails to hit the designated area, then the field goal is missed. If the dart hits completely outside the scoring section of the dartboard, then the field goal is blocked. A blocked field goal may be returned by the opposing player and the throw is registered like an offense throw. If the player returning a blocked field goal also fails to hit the scoring area of the dartboard, then the blocked kick is muffed and possession/first down is given back to the kicking player at the spot of the kick. After a field goal is made, the player that has made the field goal kicks off from their own thirty-yard line to the opposition player.

Safety: A safety occurs when the offense player loses enough yardage to meet or cross their own goal line. The defense player causes a safety by forcing a five or ten-yard loss when the offense player is within five or ten yards of their own goal line. If a safety is forced, then the player on defense earns two-points and will receive the football via a punt from the opposition's twenty-yard line.

Point After touchdown: After a touchdown, a winning player may go for one or two-point conversions. One-point conversions are earned by hitting an area between the inner treble line and the outer bull's eye line. If the dart lands outside this area of the dartboard, then the play is registered as a failed one-point conversion. If the dart lands completely outside the scoring section of the dartboard, then it is a turnover and the opposition makes a single response throw which is registered like a throw by a player on offense. If the response throw hits the inner bull's eye, then two points are earned by the player that has made the throw. Two-point conversions are earned by calling your shot before you throw. If the offense player hits the area of the called dartboard, then the two-point conversion is good, pending the defense player's response throw. If the defense player hits the same area as the offense player called, then the two-point conversion is not good. If the defense player does not hit the called shot, then the two-point conversion is good. If the offense player does not hit the called shot, then the two-point conversion is not good and a response throw is not necessary. If the player going for the two-point conversion throws a dart that lands completely outside the dartboard scoring area, then it simply counts as the failed two-point conversion. It should be the case that the called shots can be anything from calling odd or even segments on the dartboard, trebles or doubles, a single segment, or bull's eye inner or outer. A called shot may be anything the player going for the two-point conversion can think of and believe they can hit. But that player must be aware that a response throw will be made by the opposition, so the area called should not be too easy to hit for the opposition. At any point after touchdown attempt, the player that scored the touchdown must kickoff from their own thirty-yard line to the opposition.

Downing: A downing of the football happens when a player decides not to make a throw but desires to continue running the clock. The downing of the football is only allowed during the final two minutes of each half. It allows the player to run time off the clock when they believe throwing the dart is not to their advantage because of the defensive response throws. The downing of the football can only be performed by the player on offense and cannot be performed for a kickoff. The player must announce their intentions to down the football before downing the football.

Kickoff: The kickoffs are performed at the beginning of each half, after field goals and after one/two point conversions. For starting the kickoffs, the football is placed at a thirty-yard line of a kicking player. To perform the kickoff, a single dart is thrown by the kicking player and a response throw is made by a returning player. A landing position of the dart thrown by the kicking player on the dartboard determines how far the kick travels and the response throw made by the returning player determines how far the football is returned.

Kickoff results: A yardage cover for the kickoff is determined based on a landing position of the dart on the dartboard. To determine how far a kickoff travels, take the number of the segment the dart lands on and multiply it by four. For example, if the dart lands on a segment seven, then it is a twenty-eight yard kick. Similarly, if the dart lands on the segment fifteen, then it is a sixty-yard kick. Singles, doubles and trebles are all registered the same on kickoffs. If the results of the kick land on or past the goal line (darts landing on segments eighteen through twenty), then the returning player must decide whether to throw a response throw or take the ball at their own twenty yard line with first down.

Bull's Eye: For darts landing in the bull's eye section of the dartboard, the kick is registered as an onside kick. The kicking player will receive the football at their own forty-yard line pending the response throw made by the returning player. If the kicking player's dart lands on the outer bull's eye, then the returning player must hit the outer bull's eye section of the dartboard to gain possession of the football. If the kicking player hits the inner bull's eye section, then the returning player must hit the inner bull's eye section to gain possession of the football.

Miss: If the kicking player fails to hit a scoring area of the dartboard, then the returning player gets the football at the thirty-yard line of the yard field pending a response throw. The returning player's response throw is now registered like an offense throw instead of a kick return. If the returning player fails to hit the scoring area of the dartboard, then it is registered as a muff and the kicking player gains possession of the football.

Kickoff Returns: To return a kickoff, the returning player's throw must 'match' the kicking player's throw. To match a throw, the returning player's dart must hit the same segment number as the kicking player's throw. So, if the kicking player hits segment eight, then the returning player must hit segment eight or bull's eye section to return the kick. If the returning player's throw fails to match the kicking player's throw, then the returning player starts first down at the yard line that the football ended on after the kick (zero yard return). On occasions when the kick results in the football landing on or beyond the goal line, then the returning player has two options. The returning player may either choose to return the kick or accept a touchback. If the returning player decides to return the kick, then their dart is registered like an offense throw starting from the goal line. If the throw hits single seventeen, then the returning player starts their drive at their own seventeen-yard line. Similarly, if the throw hits treble nineteen, then the drive starts at the returning player's twenty-nine yard line. And in case the returning player decides to accept the touchback, then the drive automatically starts at the returning player's twenty-yard line.

Kickoff return results:
- Singles: If the returning player matches kicking player's throw by throwing a dart in a single section of the segment, then it is a ten-yard return from the yard line that the football landed on after the kick. If there is a thirty-six yard kick (due to the kicking player's dart landing on segment nine) and the return throw matches the kicking player throw by landing in the same single segment of nine, then the football is returned ten yards to make a net kick of twenty-six yards.
- Doubles: If the returning player matches the kicking player's throw by throwing a dart in the doubles section of a segment, then the result of the play are a thirty-yard return.
- Trebles: If the returning player matches the kicking player's throw by throwing a dart in the treble section of a segment, then the result of the play is a twenty-yard return.
- Outer bull's eye: If the returning player hits the outer bull's eye section with their throw, then it is a fifty-yard return for the football. However, if the kicking player hits the outer bull's eye for an onside kick, then only a matched return throw may give the possession of the ball to the returning player at the opposition's forty-yard line.
- Inner bull's eye: If the returning player hits the inner bull's eye section with their throw, then the result of the return is a touchdown in any situation. If the kicking player hits the inner bull's eye, then the returning player must hit the inner bull's eye section to gain possession of the ball and thus score a touchdown via hitting the inner bull's eye.
- Miss: If the returning player fails to hit the scoring area of the dartboard, then the result of the return is a muff and the opposition player gains the possession of the football at the yard line of the muff. If the football lands on the twenty-eight yard line and the returning player muffs the kick, then the kicking player gains possession of the ball at the twenty-eight yard line with first down. A kick muffed on or beyond the return player's goal line results in a touchdown for the kicking player.

Punts: The punts are a method of changing possession in which the offense player forfeits possession of the football to the defense player in exchange for field position. A punt usually occurs on a fourth down of a possession in which the offense player is out of the field goal range and does not believe that they will gain a first down on the next play. To perform a punt, the offense player announces that they will punt and then throws a single dart. A response throw is made by the opposition player receiving the punt. The number segment in which the dart lands determines the distance of the punt and the response throw determines yards the punt is returned to.

Punt Results: To determine yardage cover for a punt, the number of the segment that the dart lands on is multiplied by three. For example, if the dart lands on segment seven, then it will be considered a twenty-one yard punt. Similarly, if the dart lands on a segment fifteen, then it is a forty-five yard punt. The singles, doubles and trebles are all registered the same on punts. In case the dart lands on the outer bull's eye section, then the punt is registered as a sixty-three yard punt and in case the dart lands on the inner bull's eye section, then the punt is registered as a sixty-six yard punt.
- Miss: If the punting player fails to hit the scoring area, then the punt is registered as a block and the returning player gets the football at the yard line of the punt pending the return throw. The returning player's response throw is now registered like an offense throw instead of a punt return. If the returning player fails to hit the scoring area of the dartboard, then it will be considered as a muff and the punting player regains possession of the football with the first down.

Punt Returns: For a player to return a punt, the returning player's throw must 'match' the punting player's throw. To match the throw, the returning player's dart must hit the same segment number as the punting player's dart. So, if the punting player hits segment eight, then the returning player must hit the segment eight or bull's eye to return the punt. If the returning player's throw fails to match punting player's throw, then the returning player starts first down at the yard line that the football ended on after the punt (zero-yard return). When the punt results in the ball landing on or beyond the goal line, then the returning player has two options: the returning player may either choose to return the punt or accept a touchback. If the returning player decides to return the punt, then their throw is registered like an offense throw starting from the goal line. If the throw hits single seventeen, then the returning player starts their drive at their own seventeen-yard line. Similarly, if the throw hits treble nineteen, then the drive starts at the returning player's twenty-nine yard line. If the returning player decides to accept the touchback, then the drive automatically starts at the returning player's twenty yard line.

Punt Return Results:
- Singles: If the returning player matches punting player's throw by throwing a dart in the single section of the segment, then it is a ten-yard return from the yard line that the football landed on after the punt. For example, if there is a twenty-seven yard punt (due to the punting player's dart landing on segment nine) and the return throw matches punt player's throw by landing in the single section segment of nine, then the football is returned ten yards to make a net kick of seventeen yards.
- Doubles: If the returning player matches the punting player's throw by hitting the doubles section of a segment, then result of the play is a thirty-yard return.
- Trebles: If the returning player matches the punting player's throw by hitting the treble section of a segment, then result of the play is a twenty-yard return.
- Outer Bull's Eye: If the returning player hits the outer bull's eye section with their throw, then result of the play is a fifty-yard return.
- Inner Bull's Eye: If the returning player hits the inner bull's eye section with their throw, then result of the play is a touchdown.
- Miss: If the returning player fails to hit the scoring area of the dartboard, then the result of the return is a muff and the opposition player gains possession of the football at the yard line of the muff. If the football lands on the twenty-eight yard line and the returning player muffs the punt, then the punting player gains possession of the football at the twenty-eight yard line with a first down. A punt muffed on or beyond the returning player's goal line results in a touchdown for the punting player.

Offense: To play offense, a player i.e. an offense player throws three consecutive darts with a goal of accumulating enough yardage for a first down or a touchdown. In cases in which the offense player has accumulated enough yardage to score a touchdown or the last minute of the half comes before all three darts are thrown, then only the number of darts needed for a touchdown or to reach the final minute, will be thrown. The three original throws represent a first, a second and a third down, respectively, with the opportunity for a fourth down throw pending a defense player's three responding throws. Depending on the results of the three defense throws, the offense player may throw an additional fourth down dart if the offense player is not able to accumulate enough yardage for the first down and if the defense player has not forced a turnover. If first down yardage is achieved before all three offensive throws are made by the offense player, then the offense player may request the defense player to respond before finishing their three throws. If the first down stands after the defense player has responded, then the offense player gets a fresh set of downs with three throws in hand.

Offense results:
- Singles: When the offense player throws a dart in the singles section of a segment, then the offense player gains the number of yards that the single segment identifies. For example, if the dart hits segment seventeen, then the yardage gain for the offense player will be seventeen yards on the yard field. The calculation of yardage gain is defined in a set of rules defined for offense.
- Doubles: When the offense player throws a dart in the doubles section of a segment, then the offense player gains the number of yards that the double segment identifies plus twenty yards. For example, if the dart hits the doubles segment of seventeen, then the offense player gains '17+20' i.e. thirty-seven yards.
- Trebles: When the offense player throws a dart in the treble section of a segment, then the offense player gains the number of yards that the trebles segment identifies plus ten yards. For example, if the dart hits the trebles segment of seventeen, then the offense gains '17+10' i.e. twenty-seven yards.
- Outer Bull's Eye: When the offense player throws a dart in the outer bull's eye section, then the offense player gains fifty-yards on the yard field.
- Inner Bull's Eye: When the offense player throws a dart in the inner bull's eye section, then a touchdown is considered pending the response throw.
- Miss: When the offense player throws a dart that fails to land in the scoring section of the dartboard, then the throw is registered as a no gain for the offense player and the defense player is given a chance to hit the bull's eye section (to force a turnover) on the subsequent corresponding defense throw. If the offense player throws a miss on a second down (second throw), then the defense player will have the opportunity to hit the bull's eye without needing a prior 'matched' throw. Generally, the defense player is only allowed to force a turnover on a throw immediately following a matched throw.

Defense:
To play defense, a player i.e. the defense player attempts to prevent the offense player from scoring by matching the offense player's throws. The matching of the throws prevents first downs and creates the opportunity for turnovers for the defense player. When there is a match (hits the same section) between the defense throw and the corresponding offense throw, then the yardage gain on that play is negated for no gain. If the defense player hits a double or a treble on the match, then the offense player loses yardage on the play. On a throw immediately following a match, the defense player has the opportunity to force a turnover by hitting the bull's eye. The turnover only applies on the throws that are immediately followed by a matched throw.

To match an offense player's throw, the defense player must hit a section in correspondence to the sequence in which the offense player hits the same section. If the offense player hits sections five, treble seventeen and nine, then the defense player can only match five on the first throw, treble seventeen on the second throw and nine on the third throw. In cases of doubles and trebles, the defense must hit the doubles or trebles section (depending on whichever the offense player hits) with their throw for the throw to register as a match. If the offense player hits treble seventeen and the defense player hits double or single seventeen, then the throw does not count as a match. Conversely, if the offense player hits single seventeen and the defense player hits double or treble seventeen, then not only it is counted as a match, but it is also registered as a yardage loss for the offense player.

On plays in which a turnover is forced by the defense player, the yardage gained by the offense player on that particular play is awarded but the defense player assumes possession of the football after the yardage gain is applied. Any yardage gain performed on throws by the offense player after the down in which a turnover is forced are negated and possession of the football is given to the defense player. For example, an offense player hits segments two, sixteen and nineteen and the defense player matches the first throw and forces a turnover on the second throw by hitting the outer bull's eye, then only sixteen yards are gained on the yard field by the offense player on that set of downs and the defense player gains possession of the football after the sixteen yard throw is applied. The first throw was matched, and third throw is negated because it occurs on the down after the turnover. Also, only two minutes run off the clock because the defense player made only two response throws. If the defense player matches the second throw and then forces a turnover on the third down, then twenty-one yards are gained by the offense player but the defense negates the sixteen-yard gain while also gaining possession of the football. In this case, three minutes come off the clock because the defense made three response throws.

If the defense player forces a turnover on a down in which the yardage gained would have resulted in a touchdown, then the defense player gains possession of the football at their own twenty-yard line. If the defense player forces a turnover by matching a corresponding offense throw that landed in the outer bull's eye, then the defense player negates what would have been a fifty yard gain by the offense player and the defense player gains possession of the football. All defense throws that match the corresponding offense throw negates that offense throw in all cases.

Defense Results:
Singles: A throw by the defense player that matches the singles section of an offense throw results in no yardage gain for the offense player as explained in a set of rules defined for defense.
Doubles: A throw by the defense player that matches the doubles section of an offense throw results in a ten-yard loss for the offense player.
Trebles: A throw by the defense player that matches the treble section of an offense throw results in a five-yard loss for the offense player.
Outer Bull's Eye: A throw by the defense player that matches the outer bull's eye section results in a forced turnover. If the defense player hits the inner bull's eye on a throw corresponding to the offense player hitting the outer bull's eye, then no turnover is forced. The only time the entire bull's eye is open for a turnover is on a throw immediately following a matched throw or a throw corresponding to a miss by the offense player.
Inner Bull's Eye: A throw by the defense player that matches the inner bull's eye results in a touchdown for the defense player. If the defense player hits the outer bull's eye on a throw corresponding to the offense player hitting the inner bull's eye, then no turnover is forced. The only time the entire bull's eye is open for a turnover is on a throw immediately following a matched throw or a throw corresponding to a miss by the offense player.
Miss: A throw by the defense player that fails to hit the scoring area of the dartboard means that the offense player gains the yards corresponding to that of the defense throw and also gains the yards on the following offense throw with no contest (response throw) by the defense player. If the defense player misses on a fourth down throw in which the offense player gains enough yardage for the first down, then the defense player will not be allowed to respond to the first throw by the offense player on the following set of downs. And if the defense player misses on a fourth down throw in which the offense player does not gain enough yardage for the first down, then the defense player will not forfeit a throw on the opposition's next possession. Forfeited defensive throws do not carry over once possession changes. Also, if the defense player matches a fourth down throw by the offense player that forces a change in possessions, then that player will not have the option of forcing a turnover on the first throw of the opposition's next offensive possession. In both cases, the previous throw of the defense player does not carry over to the next possession in which that player is on defense.

FIG. 1 is an illustration of an environment 100 related to at least some example embodiments of present disclosure. The environment 100 includes, but is not limited to, a wireless communication network (e.g., a network 108) that connects entities such as, players 102 and 104, and a server 110. The players 102 and 104 are depicted to be associated with an electronic device 106 (hereinafter referred to as 'player device 106'). It should be noted that the two players are shown for the sake of simplicity, there can be more or less number of players.

In at least one example embodiment, the player device 106 is equipped with a field football dart gaming application 112 that facilitates playing of field football dart game. The player device 106 may be any communication device having hardware components for enabling User Interfaces (UIs) of the field football dart gaming application 112 to be presented on the player device 106 and the player device 106 may be capable of being connected to a wireless communication network (such as the network 108). Examples of the player device 106 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

In an embodiment, the players 102 and 104 may play the field football dart game on a physical dartboard 105 by throwing one or more physical darts 105a and 105b. Based on a landing position of the physical darts 105a and 105b on the physical dartboard 105, the players 102 and 104 may provide dart inputs to the field football dart gaming application 112 by moving one or more darts on a dartboard provided on the UI facilitated by the field football dart gaming application 112. In an embodiment, as soon as players throw the physical dart on the physical dartboard, the dart inputs are generated depending upon the throw made at the physical dartboard, and the dart inputs are automatically fed to the application 112, or can be manually fed to the application 112 by any of the players or an administrator of the play. The field football dart gaming application 112 may then calculate results of the football dart game based on the dart inputs provided by the players 102 and 104. The calculation of the results by the field football dart gaming application 112 is explained in detail in further paragraphs.

In at least one example embodiment, the players 102 and 104 may access the field football dart gaming application 112 for playing football dart game. The field football dart gaming application 112 may enable the players 102 and 104 to play the football dart game on the player device 106. The players 102 and 104 may send a request to start the football dart game from the player device 106 and based on the received request, the field football dart gaming application 112 may facilitate playing of the football dart game on the player device 106 associated with the players 102 and 104. It should be noted that the field football dart gaming application 112 may run in a multi-player mode for facilitating more than one player, such as players 102 and 104 to play the football dart game on the player device 106. In an embodiment, the players 102 and 104 may use separate devices instead of using a single device to play football dart game using the field football dart gaming application. In that case, the players 102 and 104 can be located at different locations and can connect through the field football dart gaming application 112.

In an embodiment, the server 110 provides a software application, herein referred to as the field football dart gaming application 112, in response to a request received from the player device 106 via the network 108. Examples of the network 108 include stand alone or a combination of a local area network (LAN), a wide area network (WAN), wireless, wired, any currently existing or to be developed network that can be used for communication. More specifically, an example of the network 108 can be the Internet which may be a combination of a plurality of networks. In some embodiments, the field football dart gaming application 112 may be factory-installed on the player device 106 and the players 102 and 104 may not need to specifically request the Field football dart gaming application 112 from the server 110.

In at least one example embodiment, the field football dart gaming application 112 is configured to present a user interface (UI) of the field football dart gaming application 112 on the player device 106 based on the request received from the player device 106. The UI may include a dartboard with one or more darts, a yard field with one or more yard lines, a football placed on the yard field, a scoreboard associated with each player, such as the players 102 and 104, a timer and a plurality of actionable buttons. In an embodiment, the plurality of actionable buttons may include a call shot button, a field goal button, a down ball button and a defense respond button. The field football dart gaming application 112 is further configured to facilitate playing of the football dart game by the players 102 and 104 by receiving dart inputs in response to throws of one or more physical darts, such as the darts 105a and 105b on a physical dartboard, such as the physical dartboard 105 by the players 102 and 104 and moving the football placed on the yard field in response to the dart inputs in the field football dart gaming application 112 and a plurality of pre-defined rules of the football dart game. It should be noted that the dart inputs are provided by the players 102 and 104 by moving the darts on the dartboard provided on the UI of the football dart gaming application 112.

In an embodiment, the players 102 and 104 may be required to perform a toss for starting the football dart game. In the toss, each player of the players 102 and 104 may be required to hit the physical dartboard 105 with a physical dart. A player between the players 102 and 104 whose dart will land closest to the centre i.e. near the bull's eye section of the dartboard 105 will be considered as the winner of the toss. The winner of the toss may then decide which player between the players 102 and 104 will start a kickoff. The player starting the kickoff may be considered as a first player.

The first player of the players 102 and 104 may then start the kickoff by throwing the physical dart (e.g., the dart 105a) on the dartboard 105. The field football dart gaming application 112 may then receive a first dart input in response to throwing of the physical dart by the first player on the physical dartboard 105 to start the kickoff. Once the first dart input is received, the field football dart gaming application 112 may access a set of rules defined for the kickoff. In an embodiment, the set of rules may be accessed from a database associated with the server 110. In another embodiment, the set of rules may be accessed from the player device 106. Further, the field football dart gaming application 112 may calculate a yardage gain by the football on the yard field based at least on the first dart input provided by the first player and the set of rules defined for the kickoff. It should be noted that the field football dart gaming application 112 starts the calculation of the yardage gain from a thirty-yard line of the one or more yard lines in the yard field. Additionally, the field football dart gaming application 112 may move the football placed on the yard field based on the yardage gain.

Once the football is moved based on the throw made by the first player, a second player may provide a second dart input on the field football dart gaming application 112 to play a response throw for the kickoff. The field football dart gaming application 112, after receiving second dart input in response to throwing of the physical dart by the second player on the physical dartboard 105, may access a set of rules defined for returning. The field football dart gaming application 112 may calculate a yardage loss by the football on the yard field based at least on the second dart input provided by the second player and the set of rules defined for the returning. Further, the field football dart gaming application 112 may move the football placed on the yard field based on the yardage loss to keep the football on a kickoff football location.

In at least one example embodiment, the field football dart gaming application 112 may receive a plurality of offense dart inputs in response to throwing of a plurality of physical darts on the physical dartboard 105 by the second player who has opted to play a plurality of downs as an offense player. As the second player is able to match the kickoff throw performed by the first player, the possession of the football is provided to the second player and the second player may start a set of downs as the offense player by the plurality of physical darts on the physical dartboard 105. Once the offense player provides the plurality of offense dart inputs, for each dart input, the field football dart gaming application 112 may access a set of rules defined for offense and, based at least on the dart input provided by the offense player and the set of rules defined for the offense, the field football dart gaming application 112 may calculate the yardage gain by the football on the yard field. Further, the Field football dart gaming application 112 may move the football placed on the yard field based on the calculated yardage gain. It should be noted that movement of the football placed on the yard field starts from the kickoff football location.

Further, the field football dart gaming application 112 may receive a plurality of defense dart inputs in response to throwing of the plurality of physical darts on the physical dartboard 105 by the first player who has opted to play a plurality of downs as a defense player to match the plurality of downs played by the offense player. Once the defense player provides the plurality of defense dart inputs, for each dart input, the field football dart gaming application 112 may access a set of rules defined for defense and, based at least on the dart input provided by the defense player and the set of rules defined for the defense, the field football dart gaming application 112 may calculate the yardage loss by the football on the yard field in the corresponding down. The field football dart gaming application 112 then moves the football placed on the yard field based on the calculated yardage loss. It should be noted that movement of the football placed on the yard field starts from the last football location achieved by the offense player after throwing the plurality of darts. Additionally, the field football dart gaming application 112 may deduct a single minute from the timer for each response throw made by the defense player. As three response throws are made, 3 minutes may be deducted from the clock.

In an embodiment, the field football dart gaming application 112 may provide an option to play a turnover to the defense player after determining that a defense dart input provided by the defense player is matching with a corresponding offense dart input provided by the offense player. As a match is determined between the defense throw and the corresponding offense throw, an option to play the turnover may be provided to the defense player. The field football dart gaming application 112 may then detect whether the defense player has opted for the turnover. Based on the detection that the defense player has opted for the turnover, the field football dart gaming application 112 may receive a turnover dart input in response to throwing of a physical dart by the defense player on the physical dartboard to play the turnover. In the turnover, the defense player is required to hit a bull's eye section of the dartboard with a dart to win the turnover. Further, the field football dart gaming application 112 may access a set of rules defined for turnover and, based at least on the turnover dart input provided by the defense player and the set of rules defined for the turnover, determine whether the defense player has won the turnover based. The field football dart gaming application 112 may then provide possession of the football to the defense player to start the plurality of downs as the offense player, upon determining winning of the turnover by the defense player.

The field football dart gaming application 112 may determine a scoring player between the offense player and the defense player based on the plurality of offense dart inputs provided by the offense player and the plurality of defense dart inputs provided by the defense player in the plurality of downs played by each of the offense player and the defense player, respectively. In an embodiment, the scoring player is decided based on a delivery of a touchdown that happens when movement of the football placed on the yard field accumulates enough yards to cross a goal line of opposition. Any player of the offense player or the defense player can try for hitting a field goal in the fourth-down or can kick the football to achieve a touchdown in case the enough yardage is not achieved in the plurality of downs played by the offense player or the defense player. The offense player must announce their intentions before the fourth-down throw is made. In case the player goes with the field goal, the player must hit the inner or outer bull's eye to achieve the field goal. In case the player goes with kicking the football, the player must gain minimum yards that are needed to achieve the touchdown. In case the player is not in the field goal range and is sure that they will not gain a first down on the next play, then the player can try for punt in the fourth down.

The field football dart gaming application 112 may reward the scoring player of a play with a plurality of points. Any player among the players 102 and 104 who is able to achieve the touchdown, will be considered as the scoring player and will be rewarded with the plurality of points i.e. 6 points. The field football dart gaming application 112 may then update the scoreboard associated with the scoring player with the plurality of points.

Additionally, the field football dart gaming application 112 may provide an option to the scoring player to play a point conversion game. The point conversion game is one of a one-point conversion game and a two-point conversion game. In one-point conversion game, the scoring player has a chance of winning one extra point and in the two-point conversion game, the scoring player has a chance of winning two extra points. The field football dart gaming application 112 may then receive a point conversion dart input in response to throwing of a physical dart by the scoring player on the physical dartboard to start the point conversion game. Upon receiving the point conversion dart input, the field football dart gaming application 112 may access a set of rules defined for point conversion game. Further, the field football dart gaming application 112 may determine whether the scoring player has won the point conversion game based at least on the point conversion dart input provided by the scoring player and the set of rules defined for the point conversion game. Upon determining winning of the point conversion game by the scoring player, the field football dart gaming application 112 is configured to reward the scoring player with predefined one or more points. Additionally, the field football dart gaming application 112 may update the scoreboard of the scoring player with the one or more points that are earned by playing the point conversion game.

The field football dart gaming application 112 is an application resting at the server 110. In an embodiment, the server 110 is configured to manage the field football dart gaming application 112 and communicate with devices, such as the player device 106 using the network 108. The field football dart gaming application 112 may also be accessed through the web via the network 108. In an embodiment, field football dart gaming application 112 may be accessed through the web using Internet.

Figure 7:
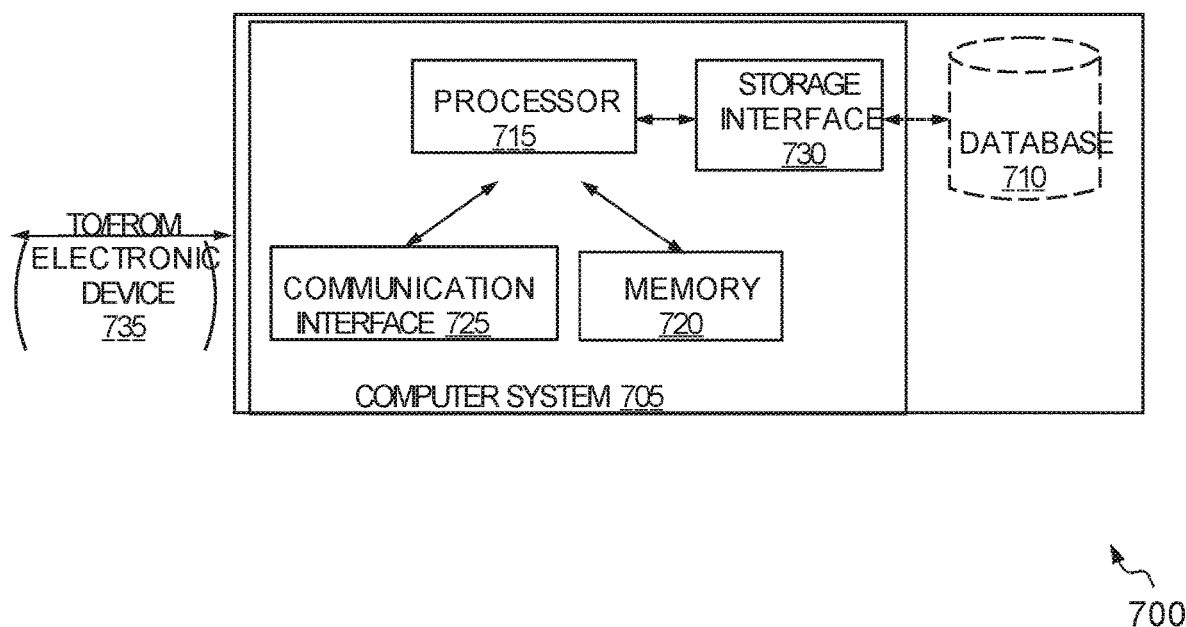
FIG. 7 is a block diagram of a server system, in accordance with an example embodiment of the present disclosure.

It is noted that the instructions (or the executable code) configuring the field football dart gaming application 112 are stored in a memory of the server 110, and the instructions are executed by a processor (for example, a single-core or a multi-core processor) included within the server 110, as is exemplarily shown with reference to FIG. 7. Accordingly, even though the various functionalities for playing football dart game are explained with reference to or being performed by the field football dart gaming application 112, it is understood that the processor in conjunction with the code in the memory is configured to execute the various tasks as enabled by the instructions of the Field football dart gaming application 112.

The various components of the field football dart gaming application 112 are further explained with reference to FIG. 2.

Figure 2:
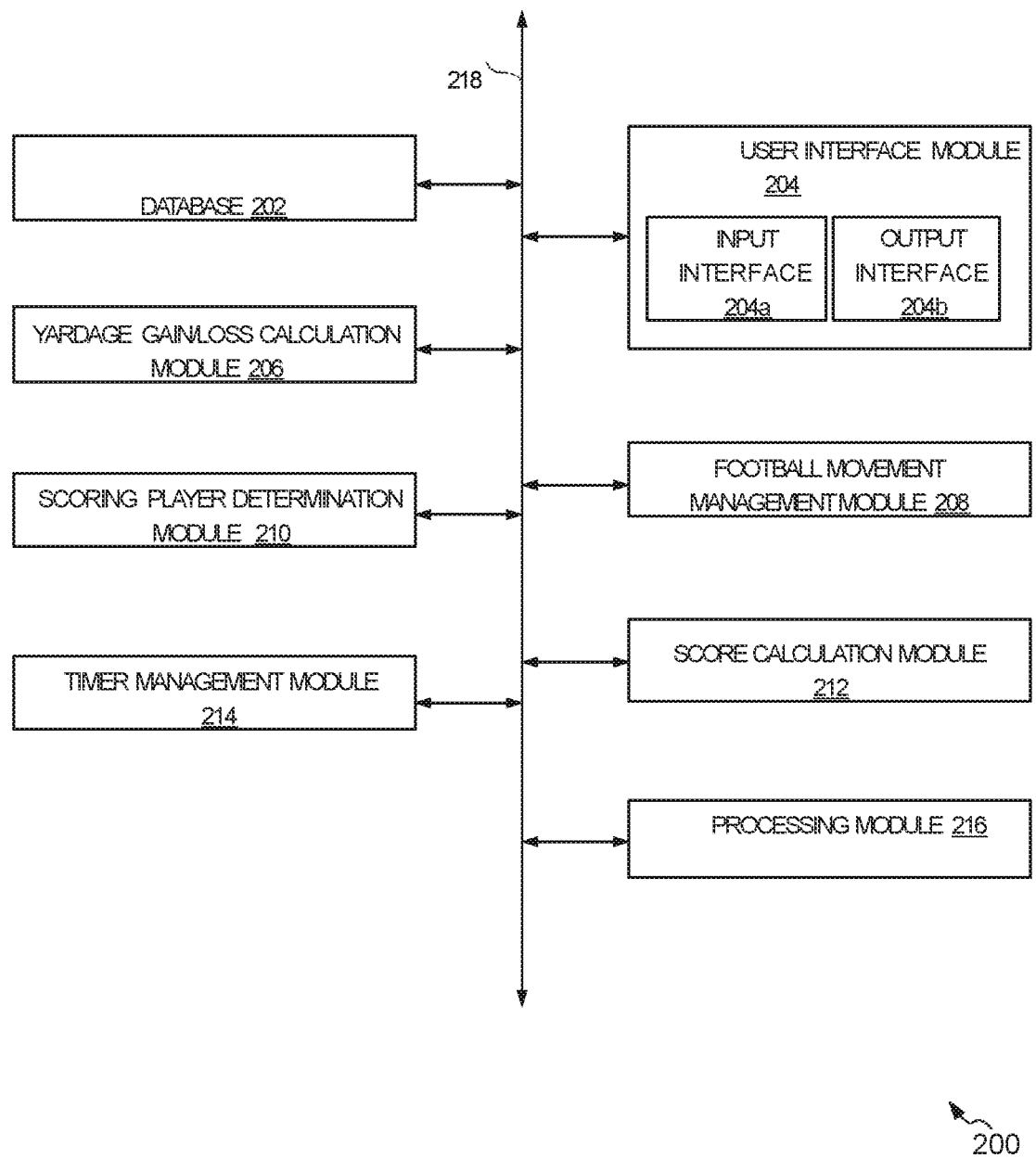
FIG. 2 is a block diagram of a system for playing field football dart game, in accordance with an example embodiment.

FIG. 2 is a block diagram of a system 200 for playing field football dart game, in accordance with an example embodiment. In an embodiment, the field football dart game is an American football dart game. The system 200 may be embodied in a server, such as the server 110 or electronic device, such as, the player device 106. The system 200 enables one or more players (e.g., the players 102 and 104) to play the football dart game. In an embodiment, the system 200 includes a database 202, a user interface (UI) module 204, a yardage gain/loss calculation module 206, a football movement management module 208, a scoring player determination module 210, a score calculation module 212, a timer management module 214, a processing module 216 and a centralized circuit system 218.

The database 202 is configured to store player details associated with each player of the one or more players. The player details may include a name of the player, e-mail id of the player etc. In an embodiment, the database 202 is also configured to store a plurality of predefined rules for playing the football dart game. The plurality of predefined rules includes, but are not limited to, a set of rules defined for offense, a set of rules defined for defense, a set of rules defined for kickoff, a set of rules defined for punting, a set of rules defined for returning, a set of rules defined for field goal, a set of rules defined for turnover, a set of rules defined for touchback, a set of rules defined for point conversion game etc.

The user interface module 204 is in communication with the database 202. The user interface module 204 is configured to present one or more UIs for facilitating playing of the football dart game. The UI module 204 includes an input interface 204a and an output interface 204b. The input interface 204a is configured to receive a request to start the football dart game. The input interface 204a is also configured to receive dart inputs provided by the players while playing the football dart game. Further, the input interface is configured to receive player details associated with players. Examples of the input interface 204a may include, but are not limited to, a keyboard, a mouse, a joystick, a keypad, a touch screen, soft keys, a floppy disk, a pen drive, a hard drive and the like. The output interface 204b is configured to display the UIs for facilitating playing of the football dart game. Examples of the output interface 204b may include, but are not limited to, a display such as a light emitting diode (LED) display, a thin-film transistor (TFT) display, a liquid crystal display, an active-matrix organic light-emitting diode (AMOLED) display, and the like.

The yardage gain/loss calculation module 206 is in communication with the UI module 204 and the database 202. The yardage gain/loss calculation module 206 is configured to calculate yardage gain/loss by a football on a yard field based on the dart inputs provided by a player of the one or more players playing the football dart game and the plurality of predefined rules defined for the football dart game. For example, if the player is playing kickoff, then the yardage gain/loss will be calculated based on the rules defined for the kickoff. Similarly, in case the player is playing a returning shot i.e. a response throw, then yardage gain/loss will be calculated based on the rules defined for the returning.

The football movement management module 208 is in communication with the yardage gain/loss calculation module 206, the UI module 204 and the database 202. The football movement management module 210 is configured to manage movement of the football on the yard field based on the calculated yardage gain/loss.

The scoring player determination module 210 is in communication with the football movement management module 208 and the UI module 204. The scoring player determination module 210 is configured to determine a scoring player among the players playing the football dart game based on a delivery of a touchdown. The player who can accumulate enough yards to cross a goal line of an opposition player will be considered as a scoring player of the play. The scoring player of the play will then be rewarded with a plurality of points. In an embodiment, the scoring player is rewarded with six points. The scoring player determination module 210 is also configured to determine if the scoring player also wins the point conversion game. Further, the scoring player determination module 210 is configured to determine a winner of a game based on points earned by each player at the end of the game. It should be noted that the game consists of a plurality of plays. The game will be considered as over when all sixty minutes have been played in the game. At the end of the game, a winner of the game is announced based on the number of points. The player with the most points wins the game.

The score calculation module 212 is in communication with the scoring player determination module 210. The score calculation module 212 is configured to update a scoreboard associated with the scoring player with the plurality of points upon receiving information from the scoring player determination module 210 about the scoring player who wins the play. The score calculation module 212 is also configured to update the scoreboard associated with the scoring player further with one or more points depending on a type of point conversion game played and won by the scoring player. In case the scoring player plays and wins the one-point conversion game, the scoreboard is updated with one more point and in case the scoring player plays and wins the two-point conversion game, the scoreboard is updated with two more points.

In an embodiment, the timer management module 214 is in communication with the UI module 204. The timer management module 214 is configured to manage a timer based on the dart inputs provided by the one or more players. The timer management module 214 deducts a single minute from the timer for every response throw dart input provided by the player of the football dart game.

The processing module 216 is in communication with the database 202, the UI module 204, the yardage gain/loss calculation module 206, the football movement management module 208, the scoring player determination module 210, the score calculation module 212 and the timer management module 214. The processing module 216 is configured to send operating instructions to the database 202, the UI module 204, the yardage gain/loss calculation module 206, the football movement management module 208, the winning player determination module 210, the score calculation module 212 and the timer management module 214 for facilitating playing of the football dart game. The processing module 216 is also configured to determine a first down position for a player on the yard field. Further, the processing module 218 is configured to manage movement of a first down marker on the yard field based on the first down position. In an embodiment, the first down marker represents a yard line that needs to be crossed for achieving the first down while a player plays a plurality of downs. Additionally, the processing module 218 is configured to manage movement of a helmet on the yard field and color change of the helmet. In an embodiment, the helmet represents an actual position of the football on the yard field for the player playing the downs and the change in color of the helmet represents the change in possession of the football.

The database 202, the UI module 204, the yardage gain/loss calculation module 206, the football movement management module 208, the winning player determination module 210, the score calculation module 212, the timer management module 214 and the processing module 216 may be configured to communicate with each other via or through the centralized circuit system 218. The centralized circuit system 218 may be various devices configured to, among other things, provide or enable communication among the modules (202-216) of the system 200. In certain embodiments, the centralized circuit system 218 may be a central printed circuit board (PCB) such as a motherboard, a main board, a system board, or a logic board. The centralized circuit system 218 may also, or alternatively, include other printed circuit assemblies (PCAs) or communication channel media. In some embodiments, the centralized circuit system 218 may include appropriate storage interfaces to facilitate communication among the modules (202-216). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3A:
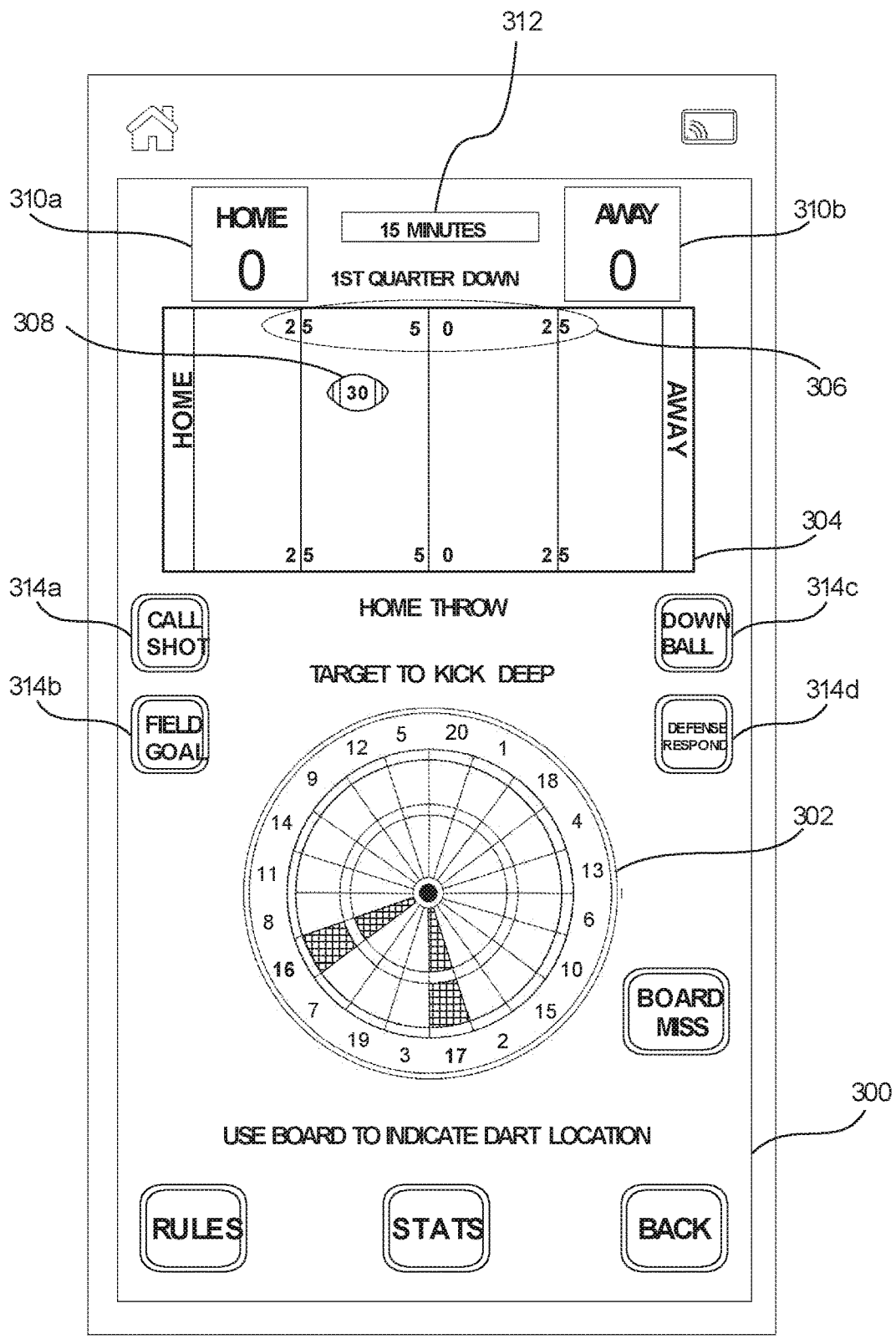
FIG. 3A is an example representation of a user interface (UI) displayed on a player device by a field football dart gaming application, in accordance with an example embodiment.
Figure 3B:
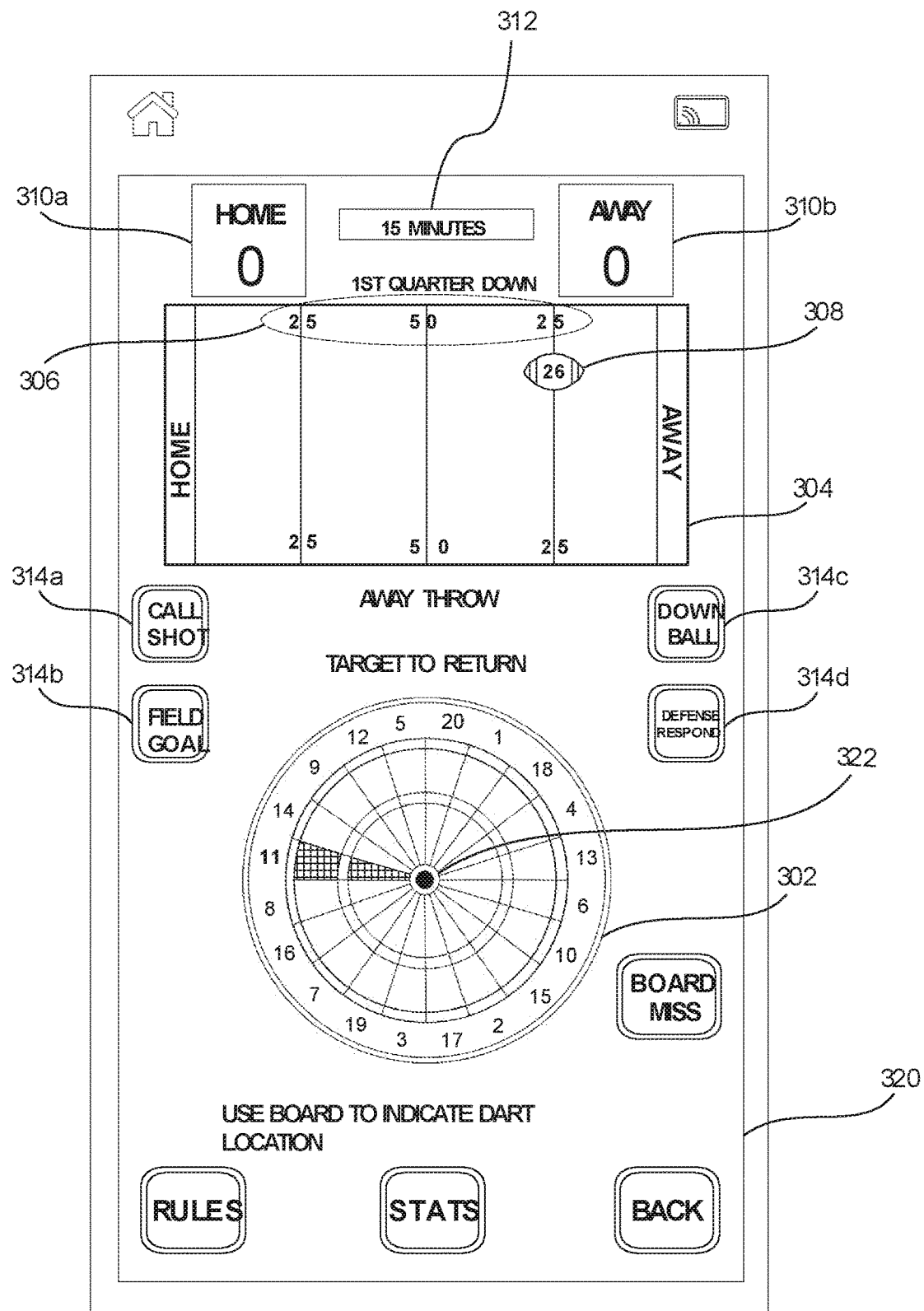
FIG. 3B is an example representation of the UI displaying result of a kickoff shot played by a home player, in accordance with an example embodiment.
Figure 3C:
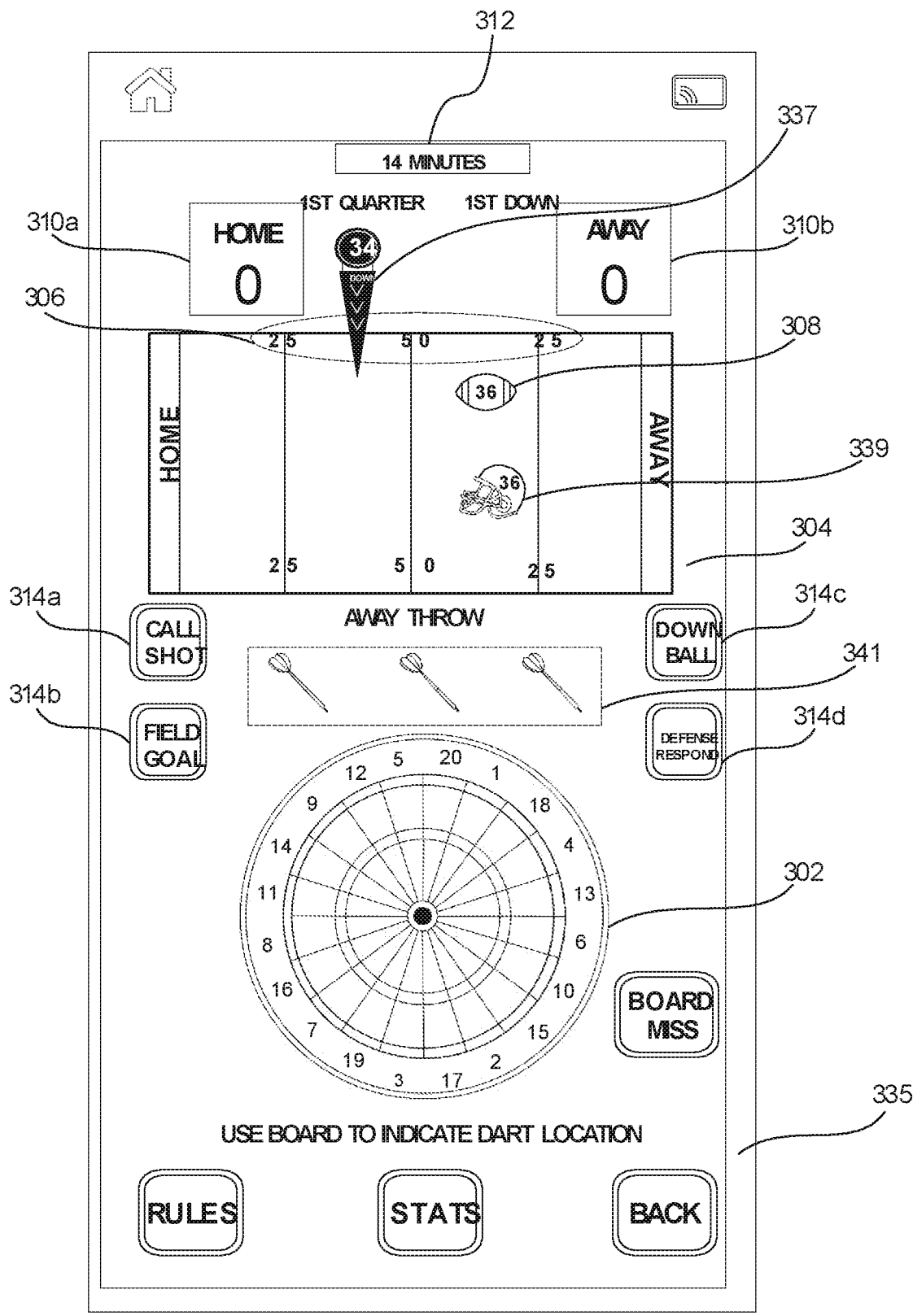
FIG. 3C is an example representation of the UI displaying result of a response throw made by an away player, in accordance with another example embodiment.
Figure 3D:
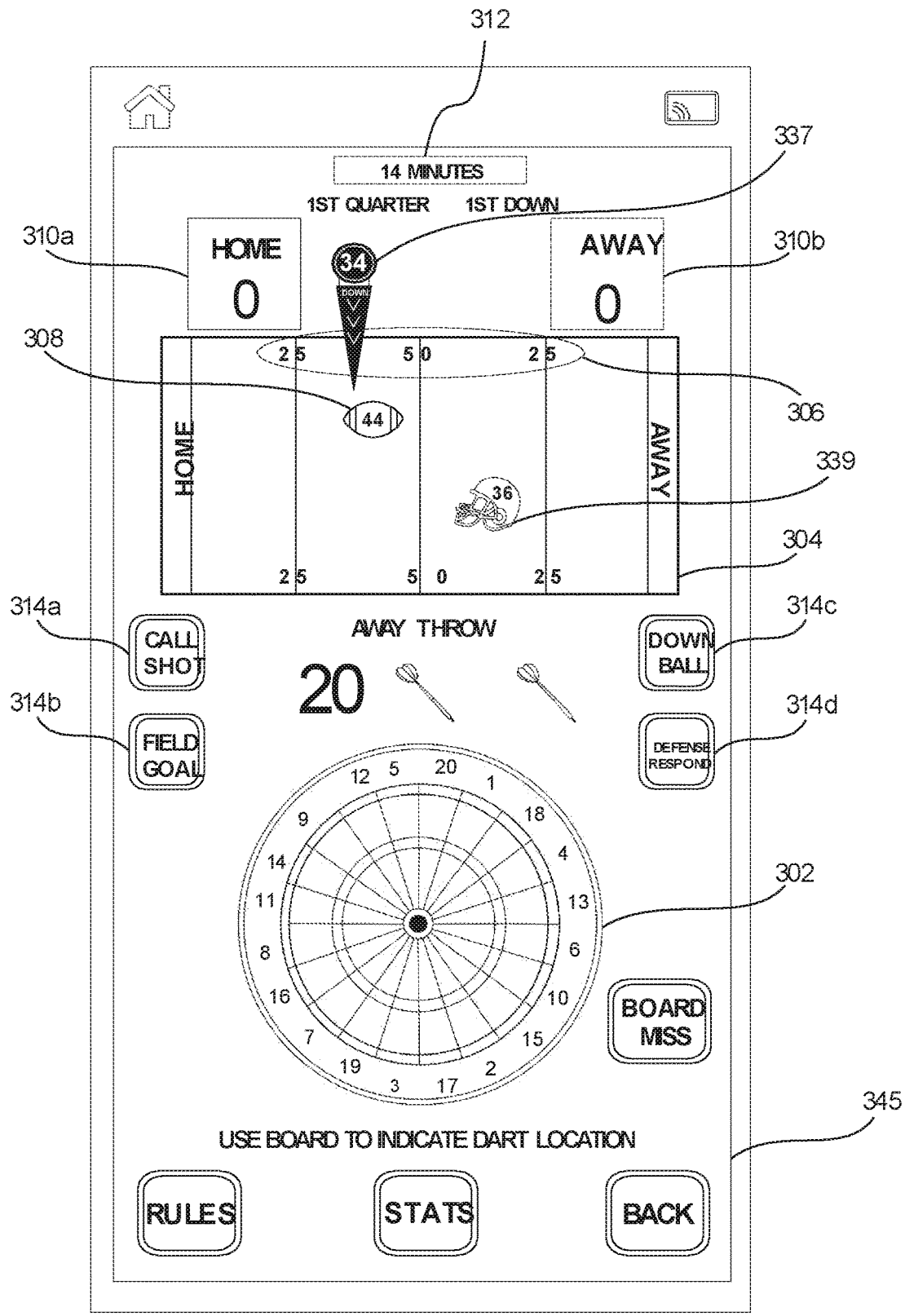
FIG. 3D is an example representation of the UI displaying result of a first down throw made by the away player, in accordance with an example embodiment.
Figure 3E:
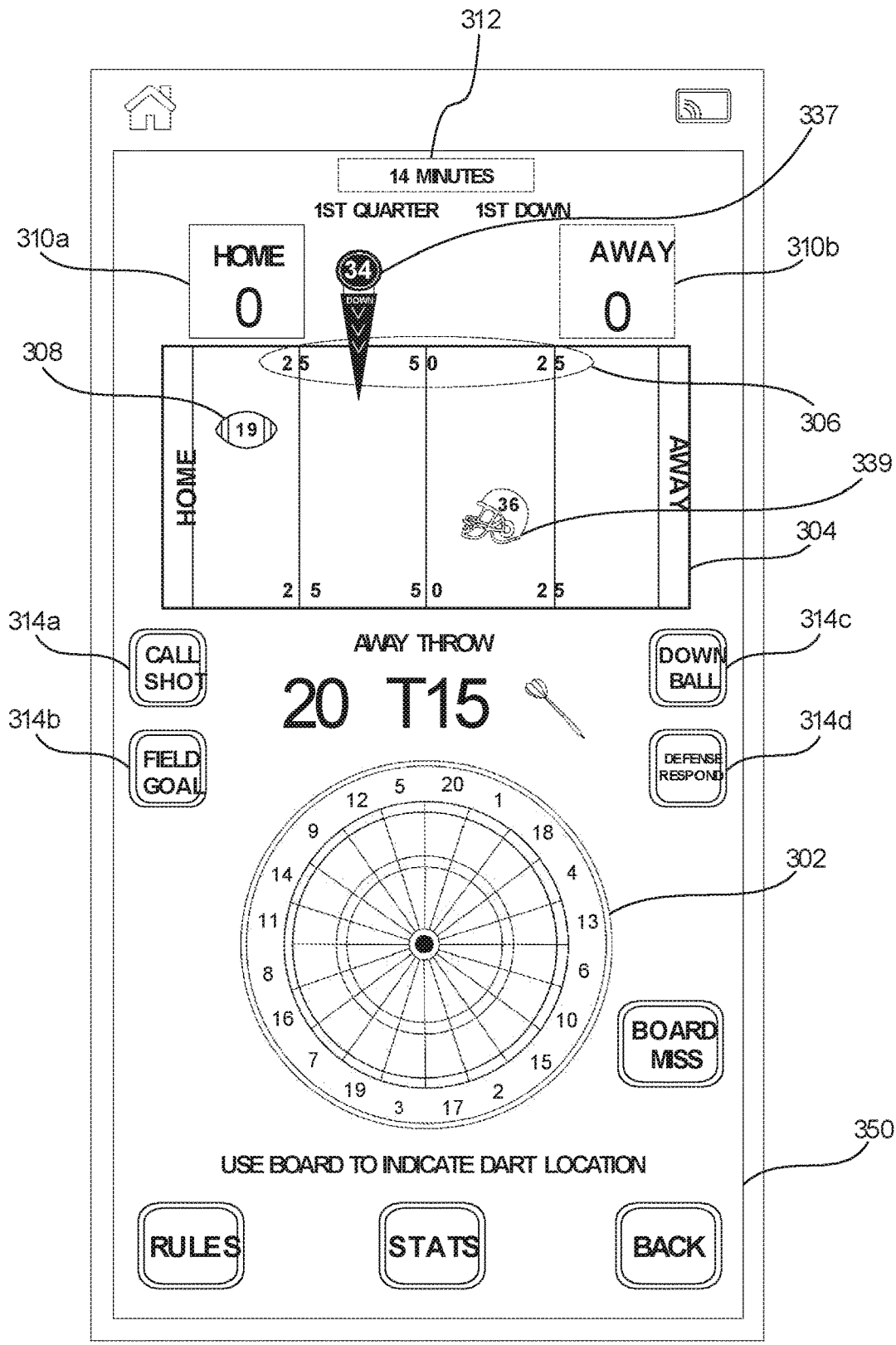
FIG. 3E is an example representation of the UI displaying result of a second down throw made by the away player, in accordance with an example embodiment.
Figure 3F:
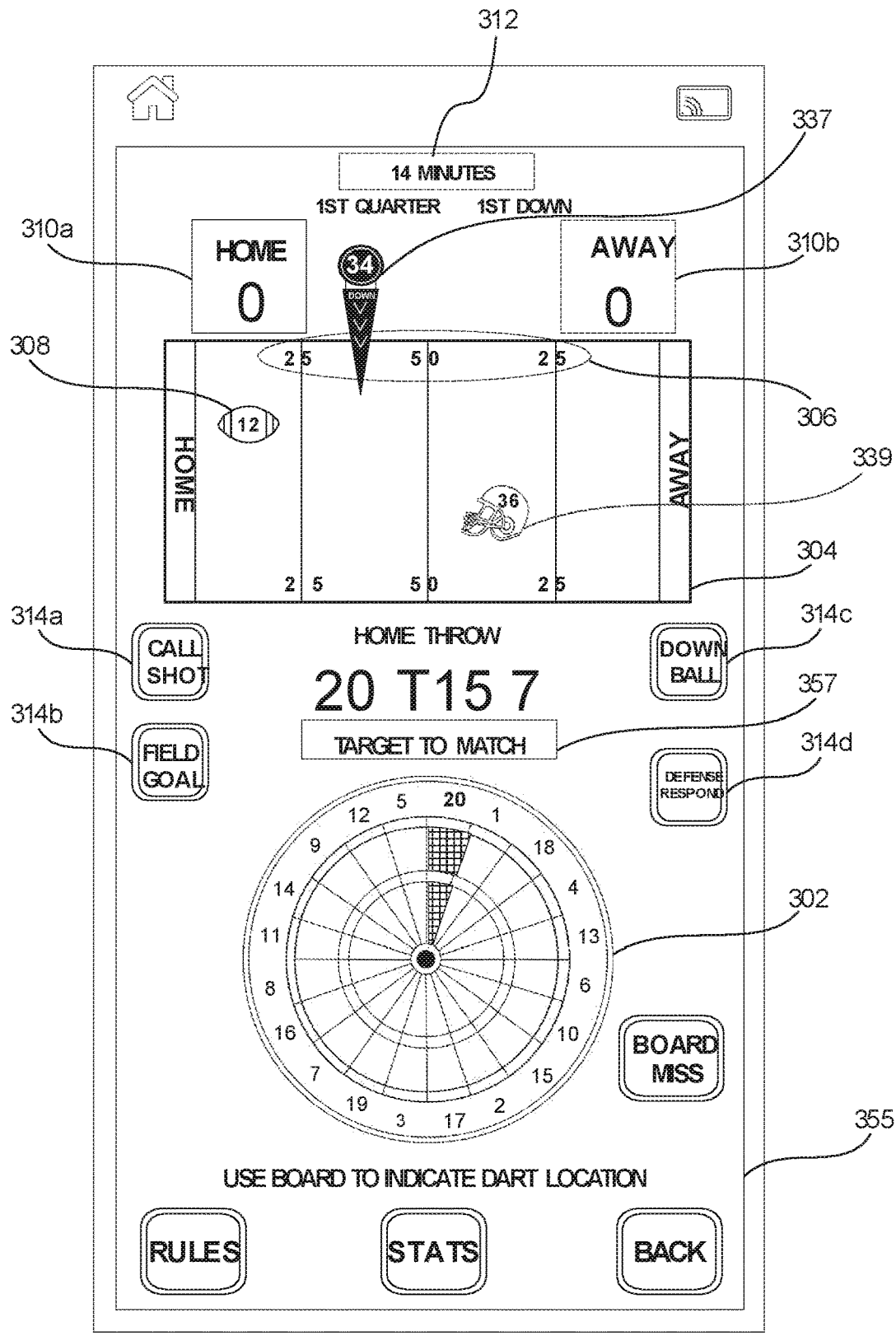
FIG. 3F is an example representation of the UI displaying result of a third down throw made by the away player, in accordance with an example embodiment.
Figure 3G:
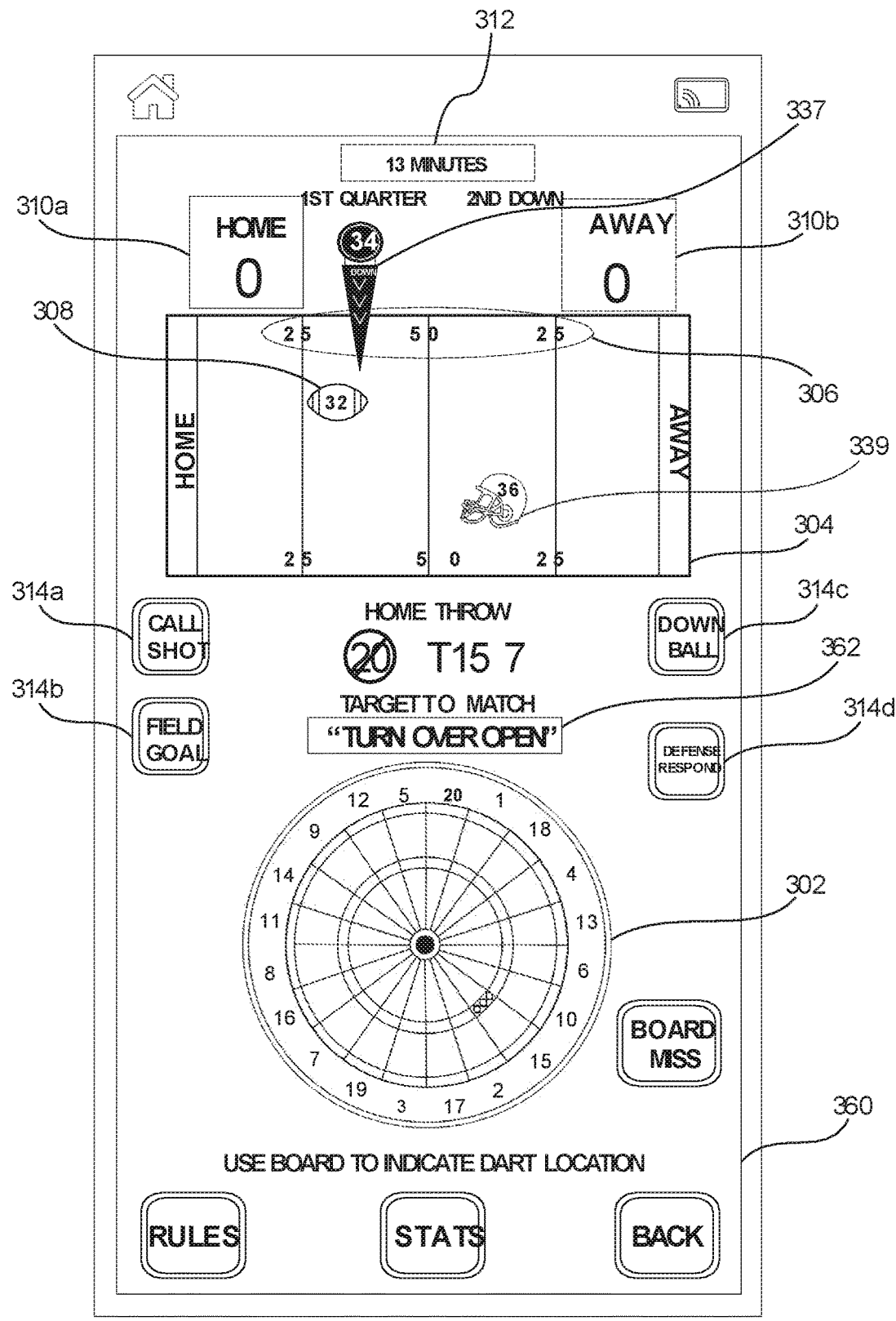
FIG. 3G is an example representation of the UI displaying result of a first response throw made by the home player, in accordance with an example embodiment.
Figure 3H:
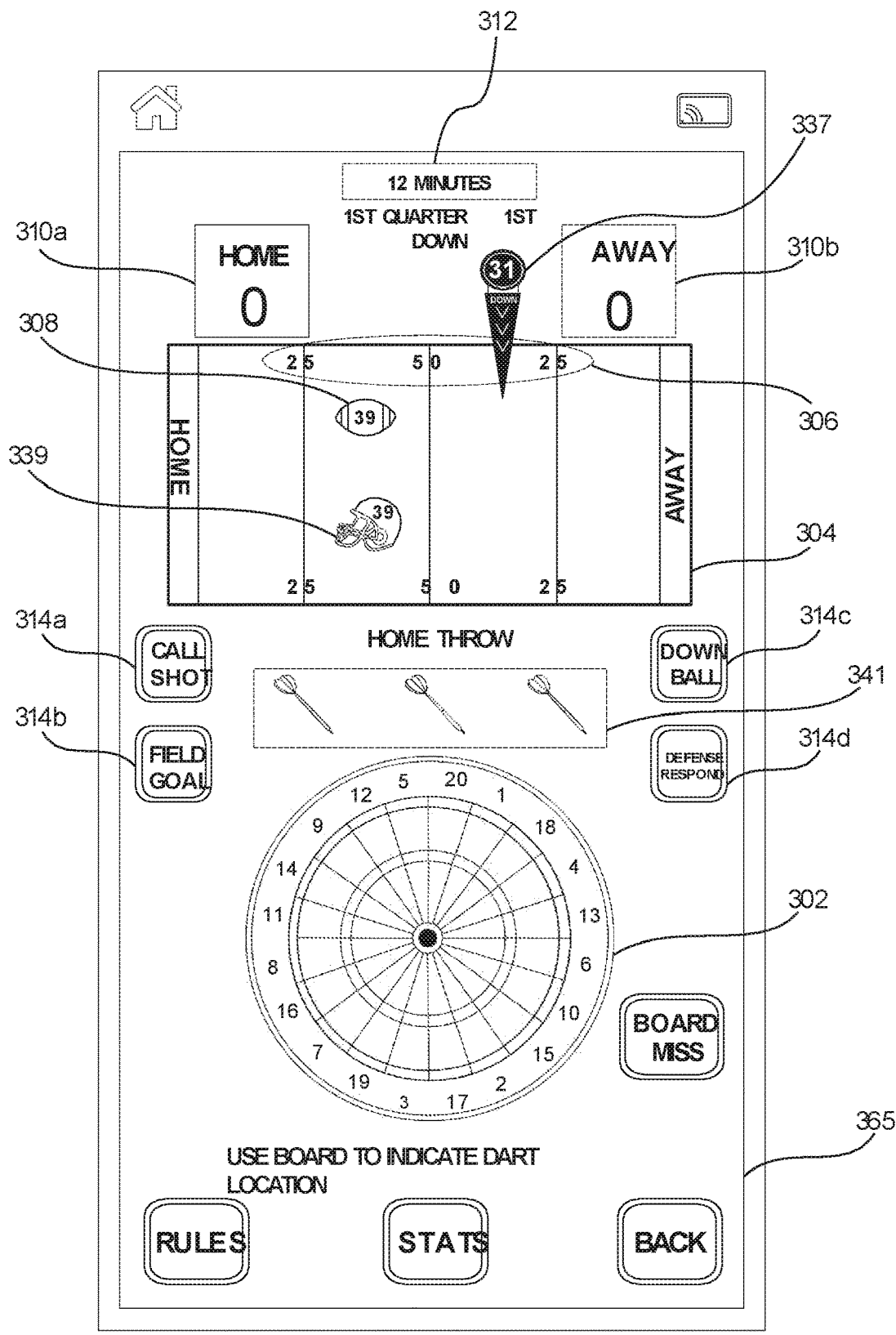
FIG. 3H is an example representation of the UI displaying change in possession of a football after the turnover, in accordance with an example embodiment.
Figure 3I:
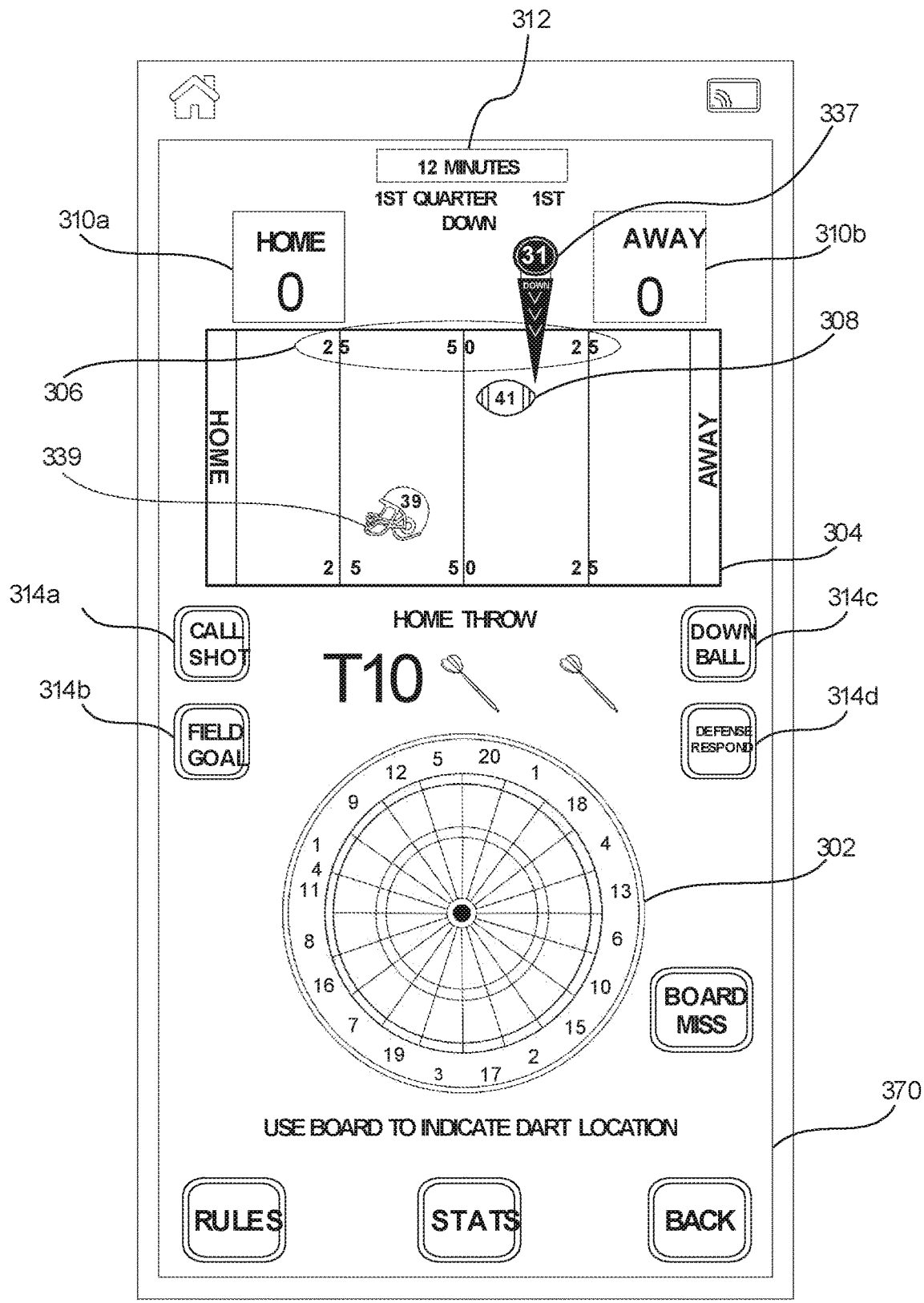
FIG. 3I is an example representation of the UI displaying result of a first down throw made by the home player, in accordance with an example embodiment.
Figure 3J:
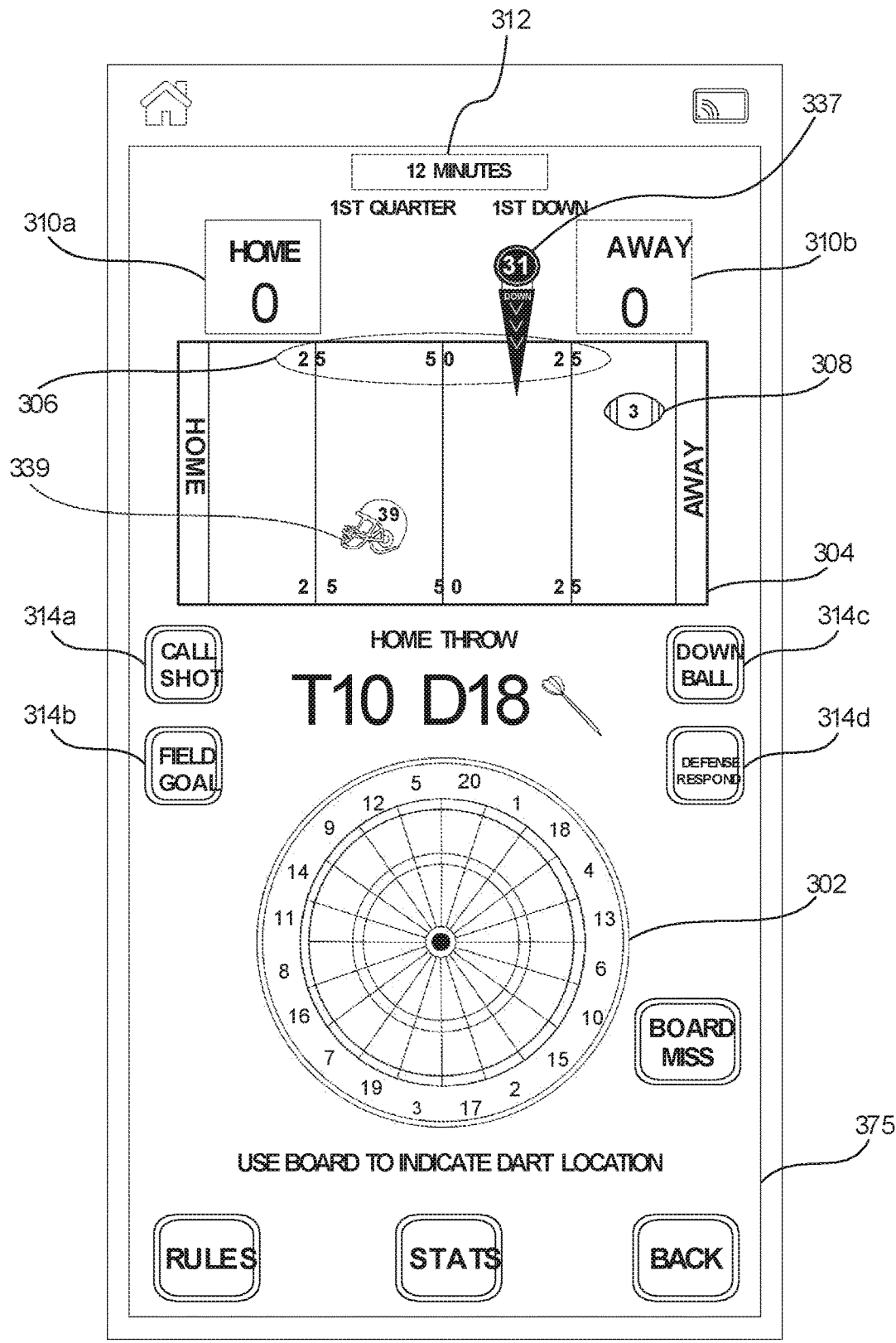
FIG. 3J is an example representation of the UI displaying result of a second down throw made by the home player, in accordance with an example embodiment.
Figure 3K:
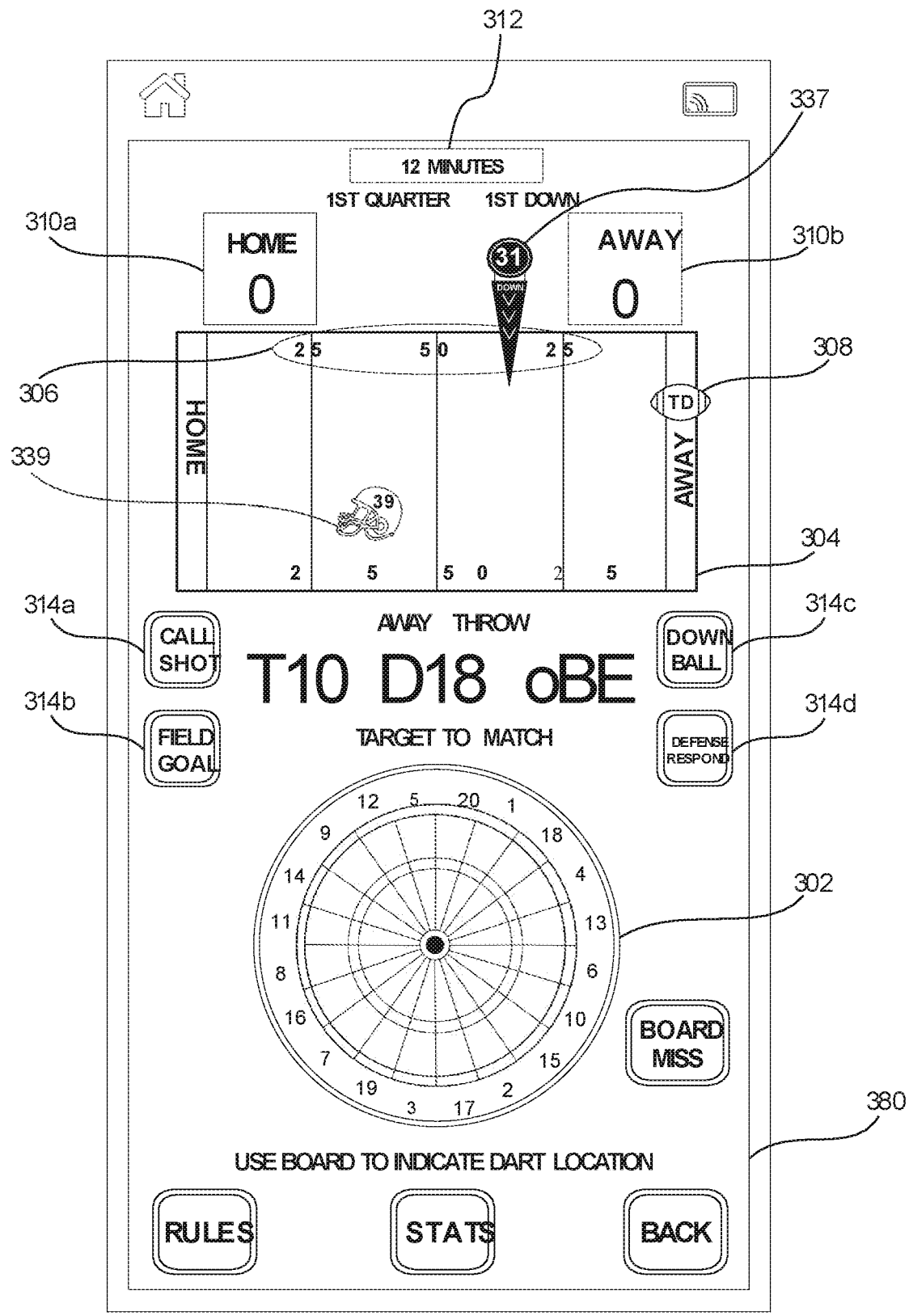
FIG. 3K is an example representation of the UI displaying result of a third down throw made by the home player, in accordance with another example embodiment.
Figure 3L:
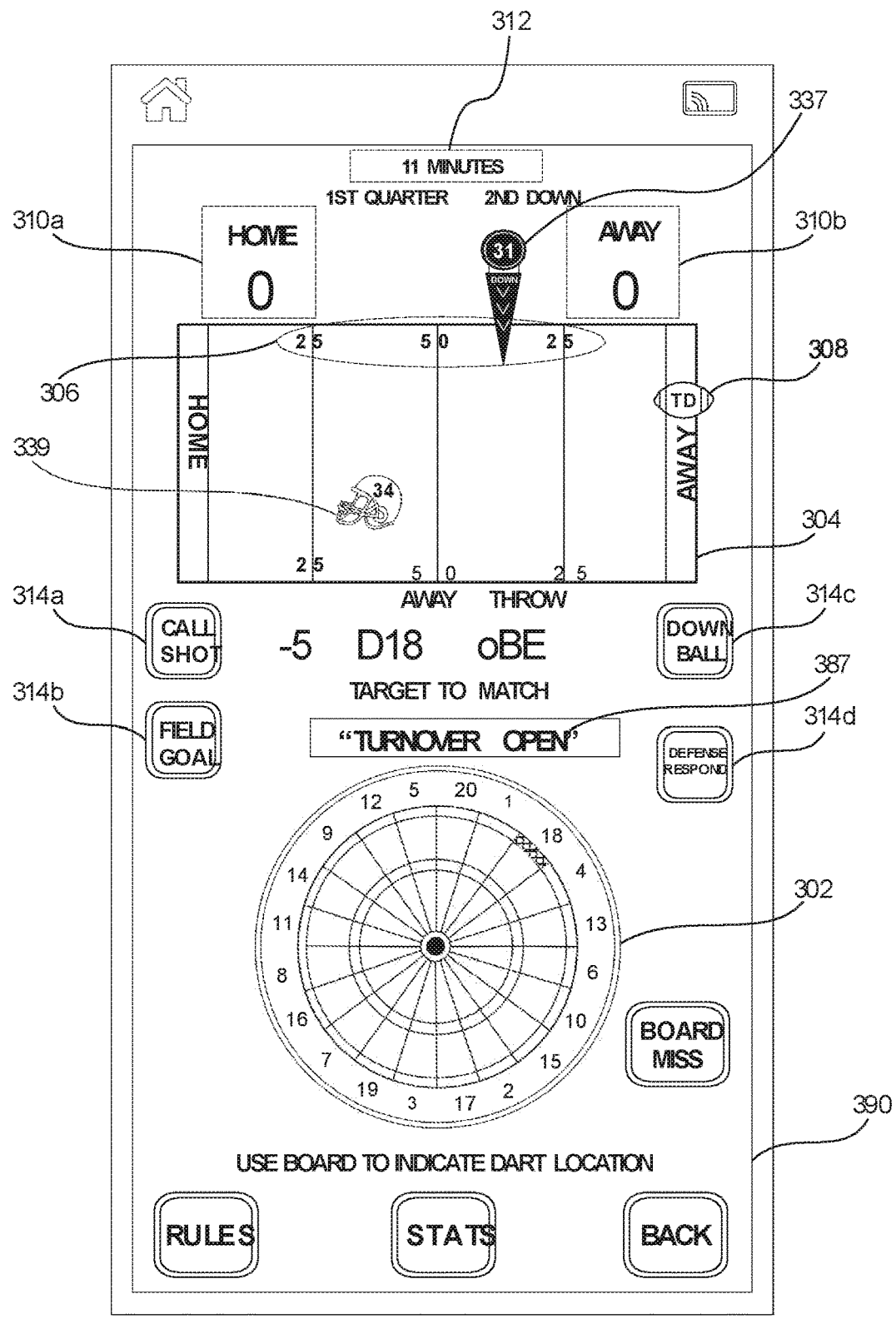
FIG. 3L is an example representation of the UI displaying result of a first response throw made by the away player, in accordance with an example embodiment.
Figure 3M:
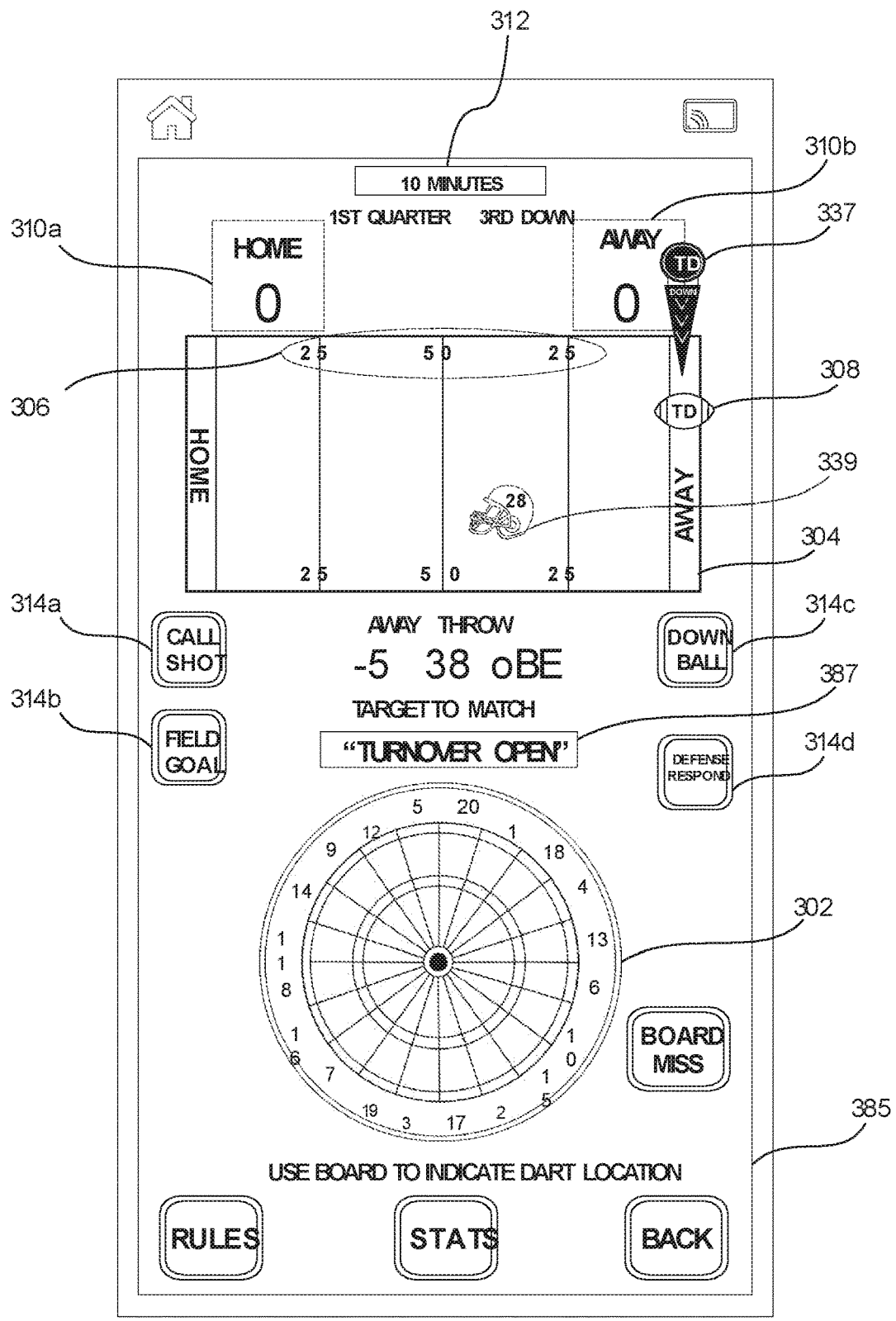
FIG. 3M is an example representation of the UI displaying result of a second response throw made by the away player, in accordance with an example embodiment.
Figure 3N:
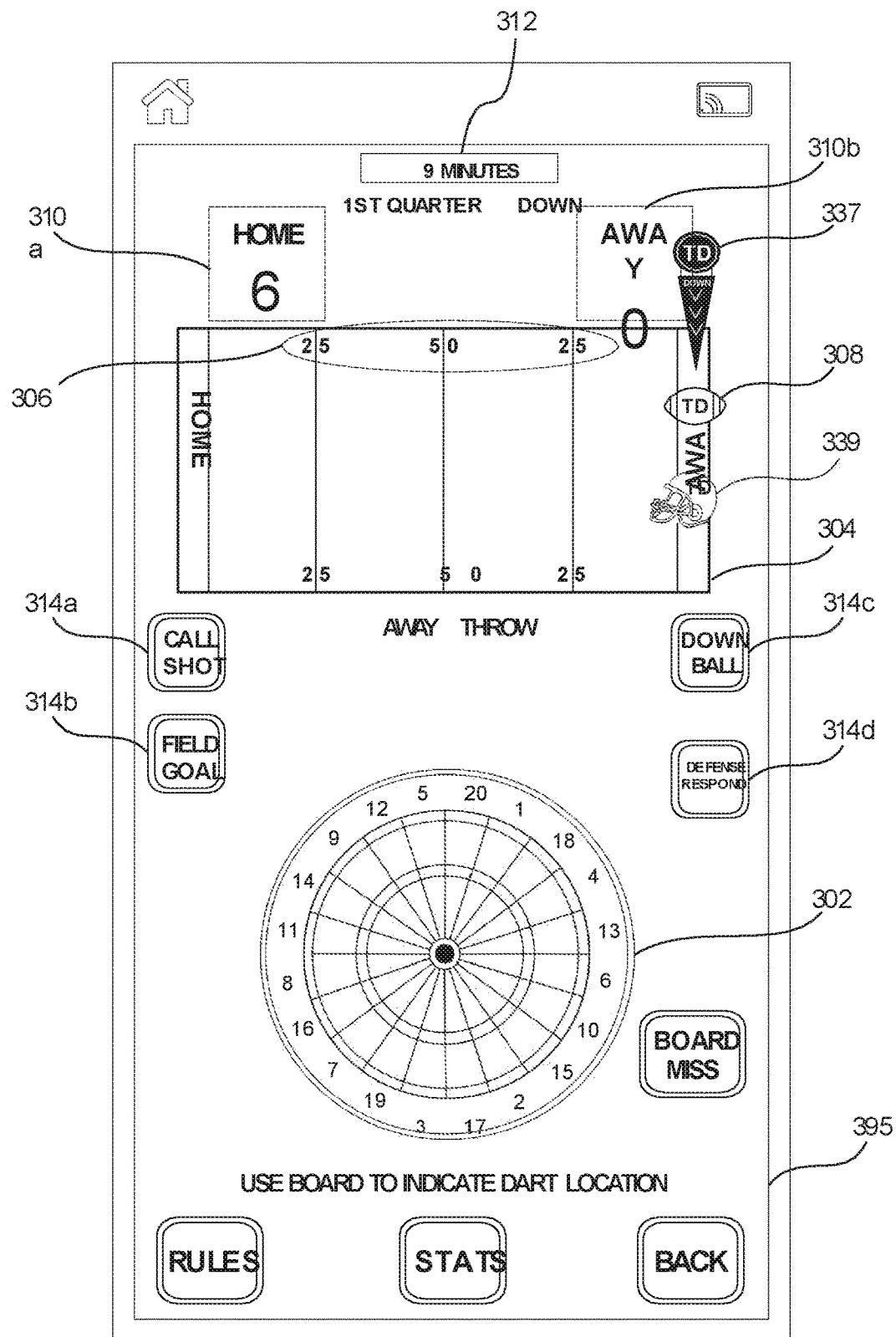
FIG. 3N is an example representation of the UI displaying result of a third response throw made by the away player, in accordance with an example embodiment.

FIGS. 3A to 3N are example representations of UIs depicting a game sequence of a field football dart game provisioned by the field football dart gaming application 112 provided on a player device (e.g., the player device 106) for enabling players (e.g., the player 102 and the player 104) to play the football dart game, in accordance with an example embodiment. The game sequence of the football dart game includes UIs 300-395 that are consecutively played back on the field football dart gaming application 112.

Referring now to FIG. 3A, an example representation of a UI 300 displayed on the player device by the field football dart gaming application 112 is illustrated, in accordance with an example embodiment. The field football dart gaming application 112 as described in FIG. 3A is accessible by players (e.g., the player 102 or the player 104) on an electronic device (e.g., the player device 106). Similarly, UIs 320 to 395 of the field football dart gaming application 112 as described in the FIGS. 3B to 3N are accessible by the players on the electronic device.

The UI 300 illustrates a kickoff page that is displayed to the players after a toss is done for starting the football dart game. The winner of the toss may either choose to start the kickoff by throwing a dart or may choose to return the kickoff. The kicking player will be considered as a home player and an opponent player will be considered as an away player. The UI 300 displays a dartboard 302, a yard field 304, yard lines 306 that are provided on the yard field 304, a football 308 placed on the yard field, a scoreboard 310a associated with the home player, a scoreboard 310b associated with the away player, a timer 312, and actionable buttons 314a to 314d. The actionable buttons 314a to 314d include a call shot button 314a, a field goal button 314b, a down ball button 314c and a defense respond button 314d. The call shot button 314a can be clicked by the home player and the away player to call a shot that a player wants to play before playing that shot. The calling of the shots usually happens in the fourth down or in case of two-point conversion game, where the player playing the shot first needs to inform the opponent player that they will be trying that particular shot, such as a punt in the fourth down. The field goal button 314b can be clicked by the home player and the away player to inform the opponent player about the field goal if the player playing the downs is trying for the field goal in the fourth down. The down ball button 314c can be clicked by the home player and the away player to inform the opponent player about playing of the fourth down. The defense respond button 314d can be clicked by the home player and the away player if a responding player doesn't want to respond to a shot played by the opponent player.

As the home player is starting the kickoff, the football 308 is placed on a 30 yard line of the yard field 304 of the home player. As the game has just started, the timer 312 is showing '15 Minutes' denoting the 15 minutes of the first quarter. The scoreboards 310a and 310b associated with the home player and the away player, respectively are '0' and '0'.

Referring now to FIG. 3B, an example representation of the UI 320 displaying result of a kickoff shot played by the home player is illustrated, in accordance with an example embodiment. As shown in the UI 320, a first dart input provided by the home player is section '11' on the dartboard 302. Based on a set of rules defined for kickoff (shown in FIG. 4), the football 308 placed on the yard field 304 travels '11*4' i.e. 44 yards on the yard field 304 from the previous location of the 30 yards as the section that is hit by the home player on the kickoff is multiplied by 4 as per the rules defined for the kickoff. So, current position of the football 308 is now at the 26 yard line of the away player as shown over the football 308. The away player may now return the kick by throwing the dart. The away player may be required to hit either the section 11 of the dartboard 302 or the bull's eye 322 of the dartboard 302.

Referring now to FIG. 3C, an example representation of the UI 335 displaying result of a response throw made by the away player is illustrated, in accordance with an example embodiment. As shown in the UI 335, the away player also hits a single part of the section 11 on a physical dartboard, so provides a second dart input by placing the dart on the single part of the section 11 on the dartboard 302. Based on the second dart input, the football 308 travels back 10 yards towards the home player end zone as per the set of rules defined for returning in FIG. 4, and the possession of the football 308 goes to the away player as the away player is able to match the kickoff throw with the response throw. The football is now at '26+10' i.e. 36 yard line of the away player and the away player has to start their possession from their own 36 yard line. A first down marker 337 is shown to be placed at 34 yard line of the home player. As the first down marker 337 indicates the yards that are to be earned in order to achieve a first down, the away player must earn 30 yards from the current position of 36 yard line to achieve the first down. A helmet 339 is also shown to be placed at 36 yard line of the yard field 304. The helmet 339 represents the beginning of the away player's offensive possession/throws from the 36 yard line of the away player.

Further, the UI 335 includes three darts 341 that represent the first three throws/downs for an offense player i.e. the away player. The timer 312 shows 14 minutes as the away player has responded to the home player's kickoff throw and on every response throw, a minute comes off the timer.

Referring now to FIG. 3D, an example representation of the UI 345 displaying result of a first down throw made by the away player is illustrated, in accordance with an example embodiment. As shown in the UI 345, the away player provides an offense dart input by moving the dart on a single part of the section 20 on the dartboard 302 on their first down, so the football 308 moves up 20 yards based on a set of rules defined for the offense to the 44 yard line of the home player's side of the yard field 304. The football 308 represents where possession for the away player could potentially be i.e. 44 yard line as home player's defensive throws are pending which can negate the away player's throws. The helmet 339 remains at the same place during the away player's throws as the helmet 339 represents the actual possession for the away player on the yard field 304 i.e. 36 yard line. The timer 312 also shows 14 minutes as no response throws are made by a defending player i.e. the home player.

Referring now to FIG. 3E, an example representation of the UI 350 displaying result of a second down throw made by the away player is illustrated, in accordance with an example embodiment. As shown in the UI 350, the away player provides the offense dart input by moving the dart on a treble part of the section 15 i.e. treble 15 on the dartboard 302 on their second down, so the football 308 moves additional 25 yards up to the 19 yard line of the home player's side of the yard field 304. The hitting of the treble section of any number while playing as offense adds an additional 10 yards to whichever numbered section has been hit, so the football is now at the 19 yard line of the home player's side of the yard field 304.

Referring now to FIG. 3F, an example representation of the UI 355 displaying result of a third down throw made by the away player is illustrated, in accordance with an example embodiment. As shown in the UI 355, the away player provides the offense dart input by moving the dart on a single part of the section 7 on the dartboard 302 on their third down, so the football 308 moves additional 7 yards up to the 12 yard line of the home player's side of the yard field 304. A 'target to match' text 357 appears on the UI 335 representing that now, it is home player's turn to respond to offense throws made by the away player. The 20 section of the dartboard 302 is also shown to be highlighted to represent that the home player must hit a 20 section of the dartboard 302 to negate the away player's first throw. The player playing as defense i.e. the home player must target the numbers in same sequence of the offense's throws i.e. throws made by the away player.

Referring now to FIG. 3G, an example representation of the UI 360 displaying result of a first response throw made by the home player is illustrated, in accordance with an example embodiment. As shown in the UI 360, the home player is able to match the away player's first throw by moving the dart on a single part of the section 20 on the dartboard 302 on their first response throw, so the football 308 comes back 20 yards away from the home player's end zone to the 32 yard line of the yard field 304. The timer 312 shows 13 minutes as the home player has responded to the away player's first down throw and on every response throw, a minute comes off the timer. It is now second down as shown below the timer 312 since the home player has already responded to the away player's first throw. A treble 15 section of the dartboard 302 is shown to be highlighted to represent that the home player must hit the treble 15 section of the dartboard 302 to negate the away player's second throw. A 'Turnover Open' text 362 appears on the UI 360 above the dartboard 302 representing that the turnover option is now available for the home player as the throw is immediately followed by a matched throw.

Referring now to FIG. 3H, an example representation of the UI 365 displaying change in possession of the football 308 after the turnover is illustrated, in accordance with an example embodiment. As shown in the UI 365, the home player has forced a turnover by moving the dart to an outer portion of the bull's eye 322 so the home player has gained the possession of the football 308 on a 39 yard line of the home side of the field. As the home player didn't match the away player's second throw of treble 15, the football 308 is supposed to move 25 yards closer to the home player's end zone i.e. '32−25=7' yard. However, the home player gained possession of the football at that point, so the football is moved to '32+7' i.e. 39 yard line of the home side of the field from where the home player will start their possession of the football 308.

The first down marker 337 is shown to be present at a 31 yard line on the away player's side of the yard field 304 which is 30 yards from the 39 yard line of the home player's side. The color of the helmet 339 is changed at the 39 yard line of the yard field 304 indicating the change in possession of the football 308 at the 39 yard line. The home player may now attempt to gain enough yards to get into the away player's end zone. The timer 312 also shows 12 minutes as one minute comes off the clock because of the home player's response throw. It is now first down for the home player.

Referring now to FIG. 3I, an example representation of the UI 370 displaying result of a first down throw made by the home player is illustrated, in accordance with an example embodiment. As shown in the UI 370, the home player moves the dart to a treble part of the section 10 on the dartboard 302 on their first down, so the football 308 moves 20 yards up based on a set of rules defined for the offense to the 41 yard line of the away player's side of the yard field 304. The helmet 339 remains at the same place during the home player's throws as the helmet 339 represents the actual possession for the home player on the yard field 304 i.e. 39 yard line. The timer 312 also shows 12 minutes as no response throws are made by a defending player i.e. the away player.

Referring now to FIG. 3J, an example representation of the UI 375 displaying result of a second down throw made by the home player is illustrated, in accordance with an example embodiment. As shown in the UI 375, the home player moves the dart to a double part of the section 18 on the dartboard 302 on their second down, so the football 308 moves 38 yards up to the 3 yard line of the away player's side of the yard field 304 as hitting of the doubles part of a number adds 20 yards to the numbered section that is being hit.

Referring now to FIG. 3K, an example representation of the UI 380 displaying result of a third down throw made by the home player is illustrated, in accordance with an example embodiment. As shown in the UI 380, the home player moves that dart to an outer bull's eye section on the dartboard 302 on their third down, so the football 308 moves 50 yards up into the away player's end zone for a pending touchdown. The touchdown is pending as the away player must throw to respond to the touchdown. It is now away player's throw and they must match treble 10 (t10) on their first throw in sequence with the offense's throws as indicated by the highlighted treble 10 section.

Referring now to FIG. 3L, an example representation of the UI 385 displaying result of a first response throw made by the away player is illustrated, in accordance with an example embodiment. As shown in the UI 385, the away player moves the dart to the treble 10 section on the dartboard 302 on their first response that is matching with the home player's throw of treble 10, so the helmet 339 moves 5 yards back into the away player's end zone to signify a 5 yard loss for the home player. The 5 yard loss is also indicated by the number '34' on the helmet 339. A 'Turnover Open' text 387 appears on the UI 385 above the dartboard 302 representing that the turnover option is now available for the away player as the throw is immediately followed by a matched throw. The timer 312 also shows 11 minutes as one minute comes off the clock because of the away player's response throw. It is now second down for the away player in which the away player is targeting double 18 as highlighted in the dartboard 302.

Referring now to FIG. 3M, an example representation of the UI 390 displaying result of a second response throw made by the away player is illustrated, in accordance with an example embodiment. As shown in the UI 390, neither the away player is able to match the home player's throw of double 18 nor the away player hit the bull's eye 322 on the physical dartboard, so the home player gains 38 yards because of the double 18. The helmet 339 moved to the 28 yard line of the away player end zone as indicated over the helmet 339 and one minute came off the timer 312 due to the away player's response throw. The first down marker 337 is moved into the away player's end zone with the football 308 as it is 30 yards or less to the away player end zone. The football 308 is still in the away player end zone because the away player has not negated enough yards to remove the pending touchdown. The away player now must target the outer bull's eye in sequence with the home player's third throw.

Referring now to FIG. 3N, an example representation of the UI 395 displaying result of a third response throw made by the away player is illustrated, in accordance with an example embodiment. As shown in the UI 395, the away player is not able to match the home player's throw of outer bull's eye on the physical dartboard, so the helmet 339 moves up 50 yard line of the away player end zone signifying a touchdown for the home player. The timer 312 also shows 9 minutes as one minute comes off the clock because of the away player's response throw. The scoreboard 310a associated with the home player is updated with 6 points as the home player achieves the touchdown. The home player now has an option to earn 1 or 2 extra points by playing a point conversion game. The home player may kickoff to the away player after playing the point conversion game.

Figure 5:
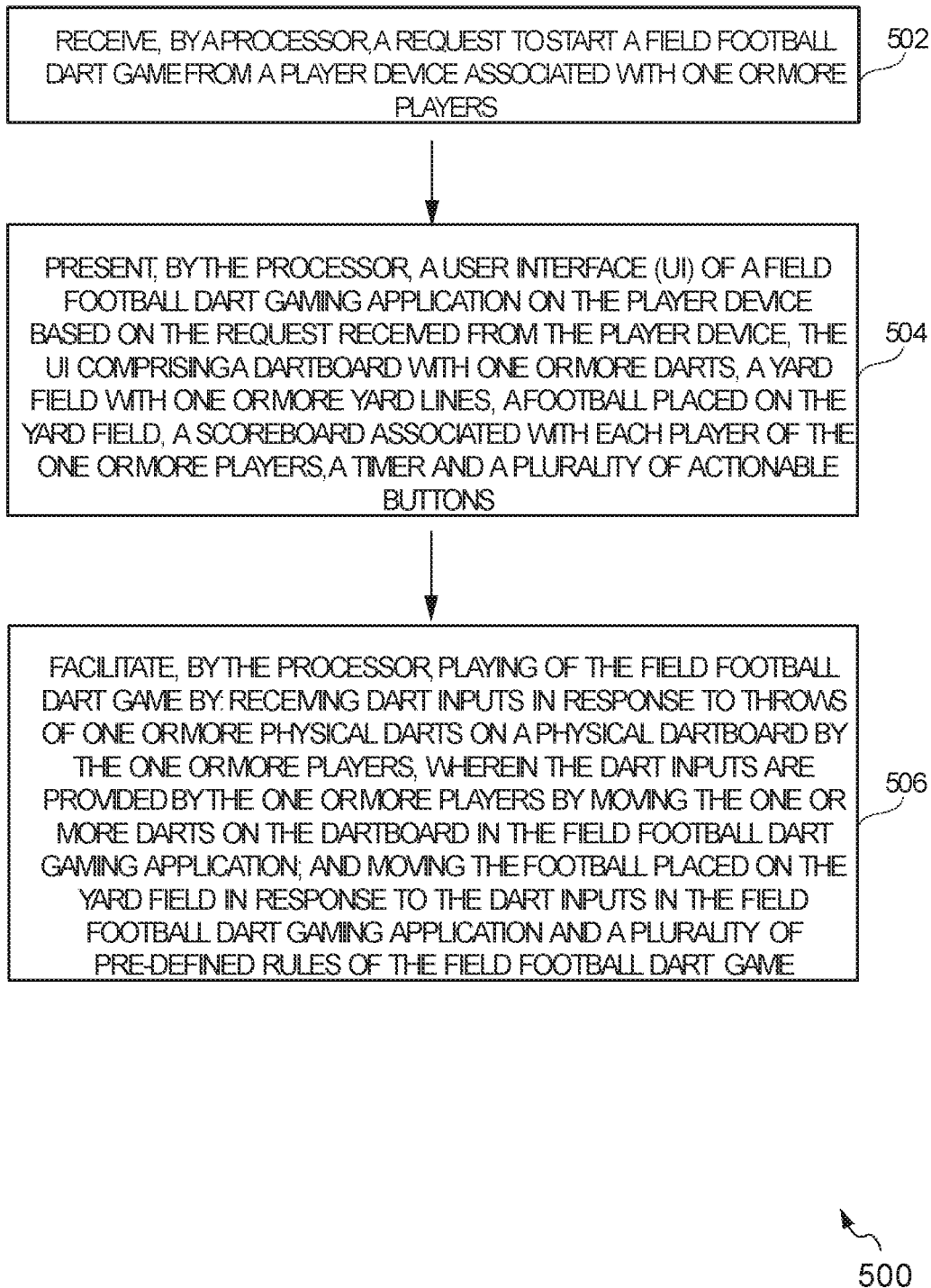
FIG. 5 is a flowchart illustrating a method for playing field football dart game, in accordance with an example embodiment.

FIG. 5 is a flowchart illustrating a method 500 for playing field football dart game, in accordance with an example embodiment. The operations of the method 500 may be carried out by a server such as the server 110, the system 200 or the player device 106. The sequence of operations of the method 500 may not be necessarily executed in the same order as they are presented. Further, one or more operations may be grouped together and performed in form of a single step, or one operation may have several sub-steps that may be performed in parallel or in sequential manner.

At operation 502, the method 500 includes receiving, by the processor, a request to start a field football dart game from a player device, such as the player device 106 associated with one or more players, such as the players 102 and 104. The players wanting to play the football dart game may open the field football dart gaming application on the player device and then may select a multiplayer mode on the field football dart gaming application to play the football dart game. The selection of the multiplayer mode by the players may send a request to start the football dart game from the player device.

At operation 504, the method 500 includes presenting, by the processor, a user interface (UI) of the field football dart gaming application on the player device based on the request received from the player device. As soon as the request for playing the football dart game is received, the UI of the field football dart gaming application is presented on the player device. The UI includes a dartboard with one or more darts, a yard field with one or more yard lines, a football placed on the yard field, a scoreboard associated with each player, a timer and a plurality of actionable buttons.

At operation 506, the method 500 includes facilitating, by the processor, playing of the field football dart game by receiving dart inputs in response to throws of one or more physical darts on a physical dartboard by the one or more players, and moving the football placed on the yard field in response to the dart inputs in the field football dart gaming application and a plurality of pre-defined rules of the field football dart game. The dart inputs are provided by the one or more players by moving the one or more darts on the dartboard in the field football dart gaming application. The players may use the UI for electronically playing the football dart game. A player of the one or more players may throw physical darts on a physical dartboard, and based on the section on which the dart lands on the physical dartboard, the player may move the darts on the dartboard provided in the UI. The dart inputs provided by the player along with the plurality of pre-defined rules may then be used by the field football dart gaming application to move the football placed in the yard field. The player is required to achieve a touchdown by covering enough yardage on the yard field so that opponent player's end zone is crossed. Once the touchdown is achieved by the player, the player will be considered as a scoring player for a play and a plurality of points will be rewarded to the scoring player.

Figure 6:
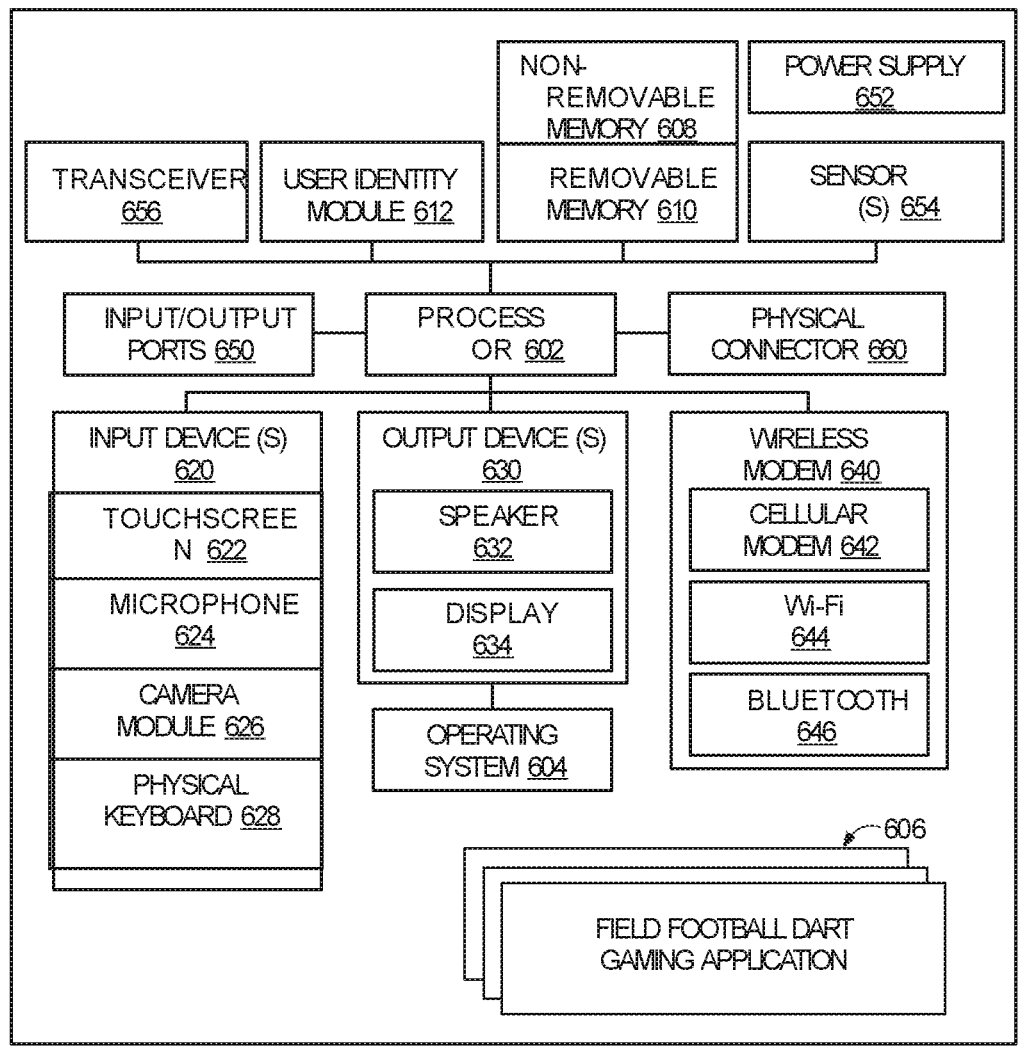
FIG. 6 is a block diagram of an electronic device capable of implementing the various embodiments of the present disclosure.

FIG. 6 shows a simplified block diagram of an electronic device 600 capable of implementing the various embodiments of the present disclosure. The electronic device 600 may be an example of the player device 106. It should be understood that the electronic device 600 as illustrated and hereinafter described is merely illustrative of one type of device and should not be taken to limit the scope of the embodiments. As such, it should be appreciated that at least some of the components described below in connection with the electronic device 600 may be optional and thus in an example embodiment may include more, less or different components than those described in connection with the example embodiment of the FIG. 6. As such, among other examples, the electronic device 600 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 600 includes a controller or a processor 602 (e.g., a signal processor, microprocessor, ASIC, or other control and processing logic circuitry) for performing such tasks as signal coding, data processing, image processing, input/output processing, power control, and/or other functions. An operating system 604 controls the allocation and usage of the components of the electronic device 600 and provides support for one or more applications programs, such as the field football dart gaming application that implements one or more of the innovative features described herein. The applications 606 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 600 includes one or more memory components, for example, a non-removable memory 608 and/or a removable memory 610. The non-removable memory 608 and/or the removable memory 610 may be collectively known as database in an embodiment. The non-removable memory 608 can include RAM, ROM, flash memory, a hard disk, or other well-known memory storage technologies. The removable memory 610 can include flash memory, smart cards, or a Subscriber Identity Module (SIM). The one or more memory components can be used for storing data and/or code for running the operating system 604. The electronic device 600 may further include a user identity module (UIM) 612. The UIM 612 may be a memory device having a processor built in. The UIM 612 may include, for example, a subscriber identity module (SIM), a universal integrated circuit card (UICC), a universal subscriber identity module (USIM), a removable user identity module (R-UIM), or any other smart card. The UIM 612 typically stores information elements related to a mobile subscriber. The UIM 612 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 600 can support one or more input devices 620 and one or more output devices 630. Examples of the input devices 620 may include, but are not limited to, a touch screen/a display screen 622 (e.g., capable of capturing finger tap inputs, finger gesture inputs, multi-finger tap inputs, multi-finger gesture inputs, or keystroke inputs from a virtual keyboard or keypad), a microphone 624 (e.g., capable of capturing voice input), a camera module 626 (e.g., capable of capturing still picture images and/or video images) and a physical keyboard 628. Examples of the output devices 630 may include, but are not limited to, a speaker 632 and a display 634. Other possible output devices can include piezoelectric or other haptic output devices. Some devices can serve more than one input/output function. For example, the touch screen 622 and the display 634 can be combined into a single input/output device.

A wireless modem 640 can be coupled to one or more antennas (not shown in the FIG. 6) and can support two-way communications between the processor 602 and external devices, as is well understood in the art. The wireless modem 640 is shown generically and can include, for example, a cellular modem 642 for communicating at long range with the mobile communication network, a Wi-Fi compatible modem 644 for communicating at short range with an external Bluetooth-equipped device or a local wireless data network or router, and/or a Bluetooth-compatible modem 646. The wireless modem 640 is typically configured for communication with one or more cellular networks, such as a GSM network for data and voice communications within a single cellular network, between cellular networks, or between the electronic device 600 and a public switched telephone network (PSTN).

The electronic device 600 can further include one or more input/output ports 650, a power supply 652, one or more sensors 654 for example, an accelerometer, a gyroscope, a compass, or an infrared proximity sensor for detecting the orientation or motion of the electronic device 600, a transceiver 656 (for wirelessly transmitting analog or digital signals) and/or a physical connector 660, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 6, or one or more operations of the flowchart 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 7 is a simplified block diagram of a server system 700, in which the field football dart gaming application 112 may be stored, in accordance with one embodiment of the present disclosure. The system 200 is an example of the server 110 shown and explained with reference to FIG. 1. The server system 700 includes a computer system 705 and one or more databases, such as a database 710.

The computer system 705 includes a processor 715 for executing instructions. Instructions may be stored in, for example, but not limited to, a memory 720. The processor 715 may include one or more processing units (e.g., in a multi-core configuration). The processor 715 is operatively coupled to a communication interface 725 such that the computer system 705 is capable of communicating with a remote device such as an electronic device 735. Example of the electronic device 735 may include, but is not limited to, the player device 106 shown in FIG. 1.

The processor 715 may also be operatively coupled to the database 710. The database 710 may be configured to store a plurality of predefined rules associated with the football dart game. The database 710 is any computer-operated hardware suitable for storing and/or retrieving data. The database 710 may include multiple storage units such as hard disks and/or solid-state disks in a redundant array of independent disks (RAID) configuration. The database 710 may include, but not limited to, a storage area network (SAN) and/or a network attached storage (NAS) system.

In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 730. The storage interface 730 is any component capable of providing the processor 715 with access to the database 710. The storage interface 730 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The memory 720 is a storage device embodied as one or more volatile memory devices, one or more non-volatile memory devices, and/or a combination of one or more volatile memory devices and non-volatile memory devices, for storing micro-contents information and instructions. The memory 720 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a generalpurpose computer, special purpose computer, or other programmable data processing apparatus to cause a device, such that the set of instructions when executed on the computer or other programmable data processing apparatus creates a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application and\or implementation without departing from the spirit or scope of the claims.

What is claimed is:

1. A method, comprising:
receiving, by a processor, a request to start a field football dart game from a player device associated with one or more players;
presenting, by the processor, a user interface (UI) of a field football dart gaming application on the player device based on the request received from the player device, the UI comprising a dartboard with one or more darts, a yard field with one or more yard lines, a football placed on the yard field, a scoreboard associated with each player of the one or more players, a timer and a plurality of actionable buttons, wherein the actionable buttons include a call shot button, a field goal button, a down ball button and a defense respond button, wherein the defense respond button is selected by a first player and a second player, when a responding player does not want to respond to a shot played by an opponent player;
facilitating, by the processor, playing of the field football dart game by: receiving dart inputs in response to throws of one or more physical darts on a physical dartboard by the one or more players, wherein the dart inputs are provided by the one or more players by moving the one or more darts on the dartboard in the field football dart gaming application;
moving the football placed on the yard field in response to the dart inputs in the field football dart gaming application and a plurality of pre-defined rules of the field football dart game;
accessing, by the processor, a set of rules defined for turnover, wherein the set of rules enables a defense player to force a turnover by matching a corresponding offense throw that landed in an outer bull's eye section of the dartboard;
rewarding, by the processor, the offense player with a plurality of points when the offense player matches enough yardage to meet or supersede goal line after the defense responds, then the last play results in the touchdown and if the yardage cover is not sufficient for the touchdown, then the touchdown is denied; and
deducting a single minute from the timer for every response throw dart input provided by the player of the football dart game.

2. The method as claimed in claim 1, wherein facilitating playing of the field football dart game comprises:
receiving, by the processor, a first dart input in response to throwing of a physical dart by a first player of the one or more players on the physical dartboard to start a kickoff;
accessing, by the processor, a set of rules defined for the kickoff; calculating, by the processor, a yardage gain by the football on the yard field
based at least on the first dart input provided by the first player and the set of rules defined for the kickoff, wherein the calculation of the yardage gain starts from a thirty-yard line of the one or more yard lines in the yard field; and
moving, by the processor, the football placed on the yard field based on the yardage gain.

3. The method as claimed in claim 2, further comprising:
receiving, by the processor, a second dart input in response to throwing of the physical dart by a second player of the one or more players on the physical dartboard to play a response throw for the kickoff;
accessing, by the processor, a set of rules defined for returning;
calculating, by the processor, a yardage loss by the football on the yard field based at least on the second dart input provided by the second player and the set of rules defined for the returning;
moving, by the processor, the football placed on the yard field based on the yardage loss to keep the football on a kickoff football location; and deducting, by the processor, a single minute from the timer.

4. The method as claimed in claim 3, further comprising:
receiving, by the processor, a plurality of offense dart inputs in response to throwing of a plurality of physical darts on the physical dartboard by the second player who has opted to play a plurality of downs as the offense player;
for each offense dart input of the plurality of offense dart inputs provided by the offense player to play each down of the plurality of downs, performing:
accessing, by the processor, a set of rules defined for offense;
calculating, by the processor, the yardage gain by the football on the yard field based at least on the offense dart input provided by the offense player in the corresponding down and the set of rules defined for the offense; and moving, by the processor, the football placed on the yard field based on the yardage gain; wherein movement of the football placed on the yard field starts from the kickoff football location.

5. The method as claimed in claim 4, further comprising:
receiving, by the processor, a plurality of defense dart inputs in response to throwing of the plurality of physical darts on the physical dartboard by the first player who has opted to play a plurality of downs as the defense player to match the plurality of downs played by the offense player; and
for each defense dart input of the plurality of defense dart inputs provided by the defense player to play each down of the plurality of downs, performing:
    accessing, by the processor, a set of rules defined for defense;
    calculating, by the processor, the yardage loss by the football on the yard field based at least on the defense dart input provided by the defense player in the corresponding down and the set of rules defined for the defense;
    moving, by the processor, the football placed on the yard field based on the yardage loss; and
    deducting, by the processor, the single minute from the timer;
wherein movement of the football placed on the yard field starts from a last football location achieved by the offense player based on the plurality of offense dart inputs.

6. The method as claimed in claim 5, further comprising:
determining, by the processor, a scoring player between the offense player and the defense player based on the plurality of offense dart inputs provided by the offense player and the plurality of defense dart inputs provided by the defense player in the plurality of downs played by each of the offense player and the defense player, respectively, wherein the scoring player is decided based on a delivery of a touchdown, wherein the touchdown is determined when movement of the football placed on the yard field accumulates enough yards to cross a goal line of opposition;
rewarding, by the processor, the scoring player with a plurality of points; and updating, by the processor, a scoreboard associated with the scoring player with the plurality of points.

7. The method as claimed in claim 6, further comprising:
providing, by the processor, an option to the scoring player to play a point conversion game;
receiving, by the processor, a point conversion dart input in response to throwing of a physical dart by the scoring player on the physical dartboard to start the point conversion game; accessing, by the processor, a set of rules defined for point conversion game;
determining, by the processor, whether the scoring player has won the point conversion game based at least on the point conversion dart input provided by the scoring player and the set of rules defined for the point conversion game;
upon determining winning of the point conversion game by the scoring player, rewarding, by the processor, the scoring player with predefined one or more points; and
updating, by the processor, the scoreboard associated with the scoring player with the one or more points.

8. The method as claimed in claim 7, wherein the point conversion game is one of: a one-point conversion game; and a two-point conversion game.

9. The method as claimed in claim 5, further comprising:
providing, by the processor, an option to play a turnover to the defense player after determining that a defense dart input provided by the defense player in a down is matching with a corresponding offense dart input provided by the offense player;
detecting, by the processor, whether the defense player has opted for the turnover; based on the detection, receiving, by the processor, a turnover dart input in response to throwing of a physical dart by the defense player on the physical dartboard to play the turnover;
accessing, by the processor, a set of rules defined for turnover;
determining, by the processor, whether the defense player has won the turnover based at least on the turnover dart input provided by the defense player and the set of rules defined for a turnover; and
upon determining winning of the turnover by the defense player, providing, by the processor, possession of the football to the defense player to start the plurality of downs as the offense player.

10. A server system, comprising:
a memory configured to store instructions; and
a processor configured to execute the instructions stored in the memory and thereby cause the server system to perform:
    receive a request to start a field football dart game from a player device associated with one or more players;
    present a user interface (UI) of a field football dart gaming application on the player device based on the request received from the player device, the UI comprising a dartboard with one or more darts, a yard field with one or more yard lines, a football placed on the yard field, a scoreboard associated with each player of the one or more players, a timer and a plurality of actionable buttons, wherein the actionable buttons include a call shot button, a field goal button, a down ball button and a defense respond button, wherein the defense respond button is selected by a first player and a second player, when a responding player does not want to respond to a shot played by an opponent player; and
    facilitate playing of the field football dart game by:
        receiving dart inputs in response to throws of one or more physical darts on a physical dartboard by the one or more players, wherein the dart inputs are provided by the one or more players by moving the one or more darts on the dartboard in the field football dart gaming application;
        moving the football placed on the yard field in response to the dart inputs in the field football dart gaming application and a plurality of pre-defined rules of the field football dart game;
        accessing, a set of rules defined for turnover, wherein the set of rules enables a defense player to force a turnover by matching a corresponding offense throw that landed in an outer bull's eye section of the dartboard;
        rewarding, the offense player with a plurality of points when the offense player matches enough yardage to meet or supersede goal line after the defense responds, then the last play results in the touchdown and if the yardage cover is not sufficient for the touchdown, then the touchdown is denied; and
        deducting a single minute from the timer for every response throw dart input provided by the player of the football dart game.

11. The server system as claimed in claim 10, wherein for facilitating playing of the field football dart game, the server system is further caused to:
receive a first dart input in response to throwing of a physical dart by a first player of the one or more players on the physical dartboard to start a kickoff;
access a set of rules defined for the kickoff;
calculate a yardage gain by the football on the yard field based at least on the first dart input provided by the first player and the set of rules defined for the kickoff, wherein the calculation of the yardage gain starts from a thirty-yard line of the one or more yard lines in the yard field; and
move the football placed on the yard field based on the yardage gain.

12. The server system as claimed in claim 11, wherein the server system is further caused to:
receive a second dart input in response to throwing of the physical dart by a second player of the one or more players on the physical dartboard to play a response throw for the kickoff;
access a set of rules defined for returning;
calculate a yardage loss by the football on the yard field based at least on the second dart input provided by the second player and the set of rules defined for the returning;
move the football placed on the yard field based on the yardage loss to keep the football on a kickoff football location; and
deduct a single minute from the timer.

13. The server system as claimed in claim 12, wherein the server system is further caused to:
receive a plurality of offense dart inputs in response to throwing of a plurality of physical darts on the physical dartboard by the second player who has opted to play a plurality of downs as the offense player; and
for each offense dart input of the plurality of offense dart inputs provided by the offense player to play each down of the plurality of downs, perform:
access a set of rules defined for offense;
calculate the yardage gain by the football on the yard field based at least on the offense dart input provided by the offense player in the corresponding down and the set of rules defined for the offense; and
move the football placed on the yard field based on the yardage gain, wherein
movement of the football placed on the yard field starts from the kickoff football location.

14. The server system as claimed in claim 13, wherein the server system is further caused to:
receive a plurality of defense dart inputs in response to throwing of the plurality of physical darts on the physical dartboard by the first player who has opted to play a plurality of downs as the defense player to match the plurality of downs played by the offense player; and
for each defense dart input of the plurality of defense dart inputs provided by the defense player to play each down of the plurality of downs, perform:
access a set of rules defined for defense;
calculate the yardage loss by the football on the yard field based at least on the defense dart input provided by the defense player in the corresponding down and the set of rules defined for the defense;
move the football placed on the yard field based on the yardage loss; and deduct the single minute from the timer,
wherein movement of the football placed on the yard field starts from a last football location achieved by the offense player based on the plurality of offense dart inputs.

15. The server system as claimed in claim 14, wherein the server system is further caused to:
determine a scoring player between the offense player and the defense player based on the plurality of offense dart inputs provided by the offense player and the plurality of defense dart inputs provided by the defense player in the plurality of downs played by each of the offense player and the defense player, respectively, wherein the scoring player is decided based on a delivery of a touchdown, wherein the touchdown is determined when movement of the football placed on the yard field accumulates enough yards to cross a goal line of opposition;
reward the scoring player with a plurality of points; and
update a scoreboard associated with the scoring player with the plurality of points.

16. The server system as claimed in claim 15, wherein the server system is further caused to:
provide an option to the scoring player to play a point conversion game;
receive a point conversion dart input in response to throwing of a physical dart by the scoring player on the physical dartboard to start the point conversion game;
access a set of rules defined for point conversion game;
determine whether the scoring player has won the point conversion game based at least on the point conversion dart input provided by the scoring player and the set of rules defined for the point conversion game;
upon determining winning of the point conversion game by the scoring player, reward the scoring player with predefined one or more points; and
update the scoreboard associated with the scoring player with the one or more points.

17. The server system as claimed in claim 16, wherein the point conversion game is one of: a one-point conversion game; and a two-point conversion game.

18. The server system as claimed in claim 14, wherein the server system is further caused to:
provide an option to play a turnover to the defense player after determining that a defense dart input provided by the defense player in a down is matching with a corresponding offense dart input provided by the offense player;
detect whether the defense player has opted for the turnover;
based on the detection, receive a turnover dart input in response to throwing of a physical dart by the defense player on the physical dartboard to play the turnover;
access a set of rules defined for turnover;
determine whether the defense player has won the turnover based at least on the turnover dart input provided by the defense player and the set of rules defined for a turnover; and
upon determining winning of the turnover by the defense player, providing, by the processor, possession of the football to the defense player to start the plurality of downs as the offense player.

19. A system comprising:
a database configured to store a plurality of pre-defined rules for playing an American football dart game;
a user interface (UI) module in communication with the database, the UI module configured to present one or more user interfaces (UIs) for facilitating playing of the American football dart game including a dartboard with one or more darts, a yard field with one or more yard lines, a football placed on the yard field, a scoreboard associated with each player of the one or more players, a timer and a plurality of actionable buttons, wherein the actionable buttons include a call shot button, a field goal button, a down ball button and a defense respond button, wherein the defense respond button is selected by a first player and a second player, when a responding player does not want to respond to a shot played by an opponent player;

a timer management module in communication with the UI module, the timer management module configured to manage a timer based on throws made by the one or more players and deducting a single minute from the timer for every response throw dart input provided by the player of the football dart game;

a yardage gain/loss calculation module in communication with the UI module and the database, the yardage gain/loss calculation module configured to calculate yardage gain/loss by a football on a yard field based on dart inputs provided by a player of the one or more players playing the American football dart game and the plurality of pre-defined rules defined for the American football dart game, the dart inputs generated in response to throws of one or more physical darts on a physical dartboard by the one or more players wherein a set of rules enables a defense player to force a turnover by matching a corresponding offense throw that landed in an outer bull's eye section of the dartboard;

a football movement management module in communication with the yardage gain/loss calculation module, the UI module and the database, the football movement management module configured to manage movement of the football on the yard field based on the calculated yardage gain/loss;

a scoring player determination module is in communication with the football movement management module and the UI module, the scoring player determination module configured to determine a scoring player among the one or more players playing the American football dart game based on a delivery of a touchdown, and rewarding, the offense player with a plurality of points when the offense player matches enough yardage to meet or supersede goal line after the defense responds, then the last play results in the touchdown and if the yardage cover is not sufficient for the touchdown, then the touchdown is denied; and a score calculation module in communication with the scoring player determination module, the score calculation module configured to update a scoreboard associated with the scoring player with a plurality of points.

20. The system as claimed in claim 19, wherein the system further comprises:

a processing module is configured to send operating instructions to the database, the UI module, the yardage gain/loss calculation module, the football movement management module, the winning player determination module, the score calculation module and the timer management module for facilitating playing of the American football dart game.

\* \* \* \* \*